(12) United States Patent
Mihal et al.

(10) Patent No.: US 11,151,695 B1
(45) Date of Patent: Oct. 19, 2021

(54) VIDEO DENOISING USING NEURAL NETWORKS WITH SPATIAL AND TEMPORAL FEATURES

(71) Applicant: Perceive Corporation, San Jose, CA (US)

(72) Inventors: Andrew C. Mihal, San Jose, CA (US); Steven L. Teig, Menlo Park, CA (US); Eric A. Sather, Palo Alto, CA (US)

(73) Assignee: PERCEIVE CORPORATION, San Jose, CA (US)

( * ) Notice: Subject to any disclaimer, the term of this patent is extended or adjusted under 35 U.S.C. 154(b) by 127 days.

(21) Appl. No.: 16/584,888

(22) Filed: Sep. 26, 2019

Related U.S. Application Data

(60) Provisional application No. 62/901,740, filed on Sep. 17, 2019, provisional application No. 62/888,413, filed on Aug. 16, 2019.

(51) Int. Cl.
*G06T 5/00* (2006.01)
*G06N 3/08* (2006.01)
*G06N 5/04* (2006.01)
*G06N 20/10* (2019.01)

(52) U.S. Cl.
CPC .............. *G06T 5/002* (2013.01); *G06N 3/084* (2013.01); *G06N 5/046* (2013.01); *G06N 20/10* (2019.01); *G06T 2207/10016* (2013.01); *G06T 2207/20081* (2013.01); *G06T 2207/20084* (2013.01)

(58) Field of Classification Search
CPC ........... G06T 5/002; G06T 2207/20084; G06T 2207/10016; G06T 2207/20081; G06N 5/046; G06N 3/084; G06N 20/10

USPC ......................................................... 382/254
See application file for complete search history.

(56) References Cited

U.S. PATENT DOCUMENTS

| | | | |
|---|---|---|---|
| 5,956,703 A | 9/1999 | Turner et al. | |
| 10,572,979 B2 | 2/2020 | Vogels et al. | |
| 2004/0078403 A1 | 4/2004 | Scheuermann et al. | |
| 2014/0132786 A1* | 5/2014 | Saitwal | H04N 5/77 348/208.99 |
| 2018/0032846 A1* | 2/2018 | Yang | G06K 9/4604 |
| 2018/0293713 A1 | 10/2018 | Vogels et al. | |
| 2019/0114499 A1 | 4/2019 | Delaye et al. | |

(Continued)

OTHER PUBLICATIONS

Nair, "Rectified linear units improve restricted Boltzmann machines," ICML, pp. 807-814, publication year 2010.*

(Continued)

*Primary Examiner* — Juan A Torres
(74) *Attorney, Agent, or Firm* — Adeli LLP

(57) ABSTRACT

Some embodiments provide a method for processing a video that includes a sequence of images using a neural network. The method receives a set of video images as a set of inputs to successive executions of the neural network. The method executes the neural network for each successive video image of the set of video images to reduce an amount of noise in the video image by (i) identifying spatial features of the video image and (ii) storing a set of state data representing identified spatial features for use in identifying spatial features of subsequent video images in the set of video images. Identifying spatial features of a particular video image includes using the stored sets of spatial features of video images previous to the particular video image.

20 Claims, 17 Drawing Sheets

(56) References Cited

U.S. PATENT DOCUMENTS

2019/0114804 A1     4/2019     Sundaresan et al.
2020/0082540 A1*     3/2020     Roy Chowdhury .... G06T 7/194

OTHER PUBLICATIONS

He, "Delving deep into rectifiers: Surpassing human-level performance on imagenet classification," arXiv preprint arXiv:1502.01852, publication year 2015.*

Chen, Chen, et al., "Learning to See in the Dark," May 4, 2018, 10 pages, arXiv:1805.01934v1,Computer Research Repository (CoRR)—Cornell University, Ithaca, NY, USA.

Chen, Tianqi, et al., "Training Deep Nets with Sublinear Memory Cost," Apr. 22, 2016, 12 pages, arXiv:1604.06174v2, Computer Research Repository (CoRR)—Cornell University, Ithaca, NY, USA.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Guo, Jia, et al., "Stacked Dense U-Nets with Dual Transformers for Robust Face Alignment," Dec. 5, 2018, 13 pages, arXiv:1812.01936, arXiv.org.

Huang, Gao, et al.,"Multi-Scale Dense Networks for Resource Efficient Image Classification," Proceedings of the 6th International Conference on Learning Representations (ICLR 2018), Apr. 30-May 3, 2018, 14 pages, ICLR, Vancouver, Canada.

Jain, Anil K., et al., "Artificial Neural Networks: A Tutorial," Computer, Mar. 1996, 14 pages, vol. 29, Issue 3, IEEE.

Lin, Huangxing, et al., "A^2Net: Adjacent Aggregation Networks for Image Raindrop Removal," Nov. 24, 2018, 9 pages, arXiv:1811.09780v1, arXiv.org.

Non-Published Commonly Owned U.S. Appl. No. 16/584,890, filed Sep. 26, 2019, 64 pages, Perceive Corporation.

Non-Published Commonly Owned U.S. Appl. No. 16/584,891, filed Sep. 26, 2019, 64 pages, Perceive Corporation.

Srivastava, Rupesh Kumar, et al., "Highway Networks," Nov. 3, 2015, 6 pages, arXiv:1505.00387v2, Computer Research Repository (CoRR)—Cornell University, Ithaca, NY, USA.

Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.

Yu, Fisher, et al., "Deep Layer Aggregation," Jan. 4, 2019, 10 pages, arXiv:1707.06484v3, arXiv.org.

Zilly, Julian Georg, et al., "Recurrent Highway Networks," Jul. 4, 2017, 12 pages, arXiv:1607.03474v5, Computer Research Repository (CoRR)—Cornell University, Ithaca, NY, USA.

* cited by examiner

| Input | P1 | P2 | P4 | P8 |
|---|---|---|---|---|
| S1 | $S1_1$ | $S1_2$ | $S1_4$ | $S1_8$ |
| S2 | $S2_1$ | $S1_2$ | $S1_4$ | $S1_8$ |
| S3 | $S3_1$ | $S3_2$ | $S1_4$ | $S1_8$ |
| S4 | $S4_1$ | $S3_2$ | $S1_4$ | $S1_8$ |
| S5 | $S5_1$ | $S5_2$ | $S5_4$ | $S1_8$ |
| S6 | $S6_1$ | $S5_2$ | $S5_4$ | $S1_8$ |
| S7 | $S7_1$ | $S7_2$ | $S5_4$ | $S1_8$ |
| S8 | $S8_1$ | $S7_2$ | $S5_4$ | $S1_8$ |
| S9 | $S9_1$ | $S9_2$ | $S9_4$ | $S9_8$ |

*Figure 11A*

| Input | P1 | P2 | P4 | P8 |
|---|---|---|---|---|
| S1 | $S1_1$ | $S1_2$ | - | - |
| S2 | $S2_1$ | $S1_2$ | $S2_4$ | - |
| S3 | $S3_1$ | $S3_2$ | $S2_4$ | - |
| S4 | $S4_1$ | $S3_2$ | $S2_4$ | $S4_8$ |
| S5 | $S5_1$ | $S5_2$ | $S2_4$ | $S4_8$ |
| S6 | $S6_1$ | $S5_2$ | $S6_4$ | $S4_8$ |
| S7 | $S7_1$ | $S7_2$ | $S6_4$ | $S4_8$ |
| S8 | $S8_1$ | $S7_2$ | $S6_4$ | $S4_8$ |
| S9 | $S9_1$ | $S9_2$ | $S6_4$ | $S4_8$ |

*Figure 11B*

VIDEO DENOISING USING NEURAL NETWORKS WITH SPATIAL AND TEMPORAL FEATURES

BACKGROUND

Machine-learning techniques are not well-suited for many real-world applications that have both spatial and temporal scope. Perceiving objects, processes, and events in the real world requires recognizing patterns that have both spatial and temporal qualities, but temporal feature scales have not been explored in the machine learning literature. Recurrent networks such as RNNs and LSTMs can be thought of as state machines that use a trained network to compute the output and next state transition functions, given the current input and previous state variables. A common feature of these networks is that they utilize a single state variable and can therefore remember at most a single time point in the past. As a result, current recurrent networks are not able to effectively propagate information across different temporal feature scales.

BRIEF SUMMARY

Some embodiments of the invention provide a method for executing a neural network that accounts for state data from multiple previous executions of the neural network for related inputs. For a current execution of the neural network, the network receives an input to the network (e.g., an image) as well as state data generated from at least two previous executions of the neural network for related inputs (e.g., previous images in a sequence of video images). The neural network is executed using the received input and state data from multiple previous executions to generate (i) a set of output data and (ii) state data to be used in subsequent executions of the neural network for additional related inputs (e.g., subsequent images in the sequence of video images).

The neural network, as is common, includes numerous nodes that receive input values (e.g., from other nodes of the network) and generate output values (e.g., to be provided to subsequent nodes of the network). In some embodiments, a subset of these nodes also generate output state data that is stored for a period of time and used as input state data to another subset of these nodes during subsequent executions of the neural network for subsequent inputs. In some cases, the nodes in the first subset (that generate the state data for storage) are the same as or at least partially overlap with the nodes in the second subset (that use the state data during subsequent executions of the neural network). Specifically, in some embodiments, the state data generated by a particular node during one specific execution of the neural network is used by the same particular node during subsequent executions of the neural network.

In other embodiments, the state data generated by a first node during one specific execution of the neural network is used by a second, different node during subsequent executions of the neural network. The second node may come prior to or after the first node within the execution of the neural network, in various different embodiments. For instance, the second (state-receiving) node might be several layers prior to the first (state-generating) node. These "deep learnable functions" are capable in some embodiments to make a more sophisticated decision on what the next state should be.

Different embodiments use state data from different previous executions of the neural network during a current execution of the neural network. For example, some embodiments use a periodic register that stores state generated from a particular number of previous executions of the network (e.g., the eight most recent executions), and use the state data from each of these previous executions for the current execution. Other embodiments, however, store state from a particular number of previous executions, but only use the state data from a certain subset of these previous executions for the current execution (e.g., storing each of the sixteen most recent executions, but using only the state data from the $1^{st}$, $2^{nd}$, $4^{th}$, $8^{th}$, and $16^{th}$ most recent executions).

Still other embodiments use a set of periodic registers, in which only the state from certain previous executions is stored for use by subsequent executions. For some such embodiments, each of the state-generating nodes generates state for each of multiple temporal scales. In each execution of the network, different registers store different subsets of this data. For instance, one register might store state generated by the nodes to be used for the next execution of the network during every execution of the network. Another register might store state generated for a second temporal scale every other execution of the network, while a third register stores state generated for a third temporal scale every fourth execution of the network.

Some embodiments provide a neural network inference circuit to execute the neural network by incorporating state data from multiple previous executions of the network. Such a neural network inference circuit of some embodiments includes a set of computation circuits configured to execute the various nodes of the neural network, as well as a set of memories that are configured to implement a register (e.g., a shift register or periodic register) that stores the state data from prior executions of the network. In some embodiments, the neural network inference circuit includes memories for storing weight values as well as input data and intermediate activation values (i.e., values that are inputs and outputs to nodes of the neural network), and a set of memory locations of these memories are designated to implement the shift register.

Different embodiments that use a shift register implement this shift register differently. In some embodiments, each of the memory locations designated for implementing the shift register corresponds to a particular previous execution of the neural network. For example, one of the memory locations will always store the state data generated for the immediately previous execution, another memory location stores the state data generated for the execution two prior, etc., up to the earliest execution for which state data is used. In this case, the state data is moved between memory locations during each execution of the neural network (e.g., moving the state data from the memory location for storing state data generated for the immediately previous execution to the memory location for storing state data generated for the execution two prior to the current execution). To save the power required for reading and writing to memory (the most power-intensive operation in many neural network inference circuits), some embodiments instead write the generated state data in a circular manner between the designated memory locations, while modifying, at each execution, a pointer that indicates which memory location corresponds to which previous execution of the network. Once the maximum number of executions for which state data can be stored is reached (e.g., the number of memory locations designated for the shift register), the state data for the next execution is written over the oldest stored state data.

As described above, the state data generated during a particular execution of the neural network may be generated by multiple nodes of the neural network. In some embodiments, this data is concatenated into a single set of state data for storage in the register (e.g., in a predefined format that designates a particular number of bits for the state data from each of the nodes). This concatenation may occur by holding the state data from each of the nodes in a cache prior to writing the entire set of state data for the particular execution to memory, or by simply storing all of the data in the same memory location in a sequential manner such that it can be retrieved from the memory in a single read operation. To provide the state data to the nodes of subsequent operations, some embodiments retrieve the state data from each of the prior executions and parse the data from each prior execution into its constituent pieces (e.g., for different nodes of the current execution of the neural network). In addition, some embodiments concatenate the data for each particular node of the current execution from the multiple prior executions into a single piece of data that is provided to the particular node (i.e., with a first concatenated set of state data from multiple executions for a first node of the current execution, a second concatenated set of state data from multiple executions for a second node of the current execution, etc.).

In some embodiments, a neural network with the above-described structure is used to improve video by removing noise from the video (e.g., a video stream). In some such embodiments, the input to each execution of the network is one of the video images (the video being a sequence of such video images). In this case, at least a subset of the nodes of the neural network identify spatial features (e.g., edges, shapes, textures, objects, colors, etc.) of the current input image, and some of these nodes store data about these spatial features for use in subsequent executions of the network (for subsequent images in the input video stream). That is, for analyzing and de-noising one image of the video, the neural network uses both its analysis of the current image as well as analysis of previous images. This analysis can be especially helpful to reduce noise in low-light video streams. Some embodiments additionally delay the output of a video stream (e.g., by several images) so that analysis of subsequent video images can inform the output of the initial video images.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIGS. 11A-B illustrate in-phase and out-of-phase examples of storing state data from each execution in each periodic register.

DETAILED DESCRIPTION

Figure 1:
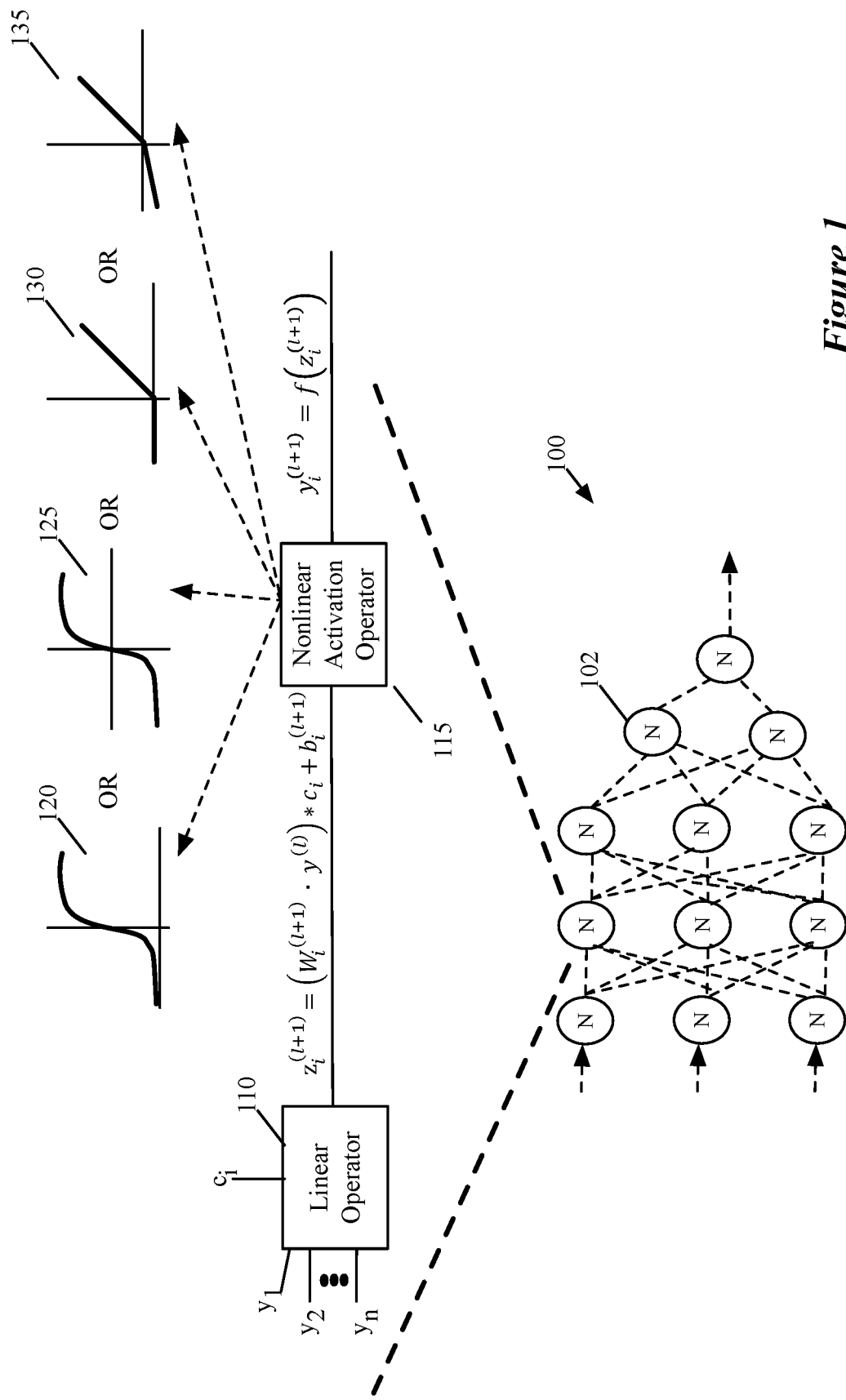
FIG. 1 illustrates an example of a multi-layer machine-trained neural network of some embodiments.

Some embodiments of the invention provide a recurrent neural network architecture for implementing spatial and temporal residual edges in machine-trained neural networks. The recurrent neural network architecture of some embodiments uses a deep learnable next state transition function to propagate information across different temporal feature scales. The resulting stateful networks are recurrent networks with spatiotemporal residual edges, here referred to as spatiotemporal residual recurrent networks (SRRNs), and which can be used for many types of machine-learning applications that are currently stateless.

The SRRNs of some embodiments excel in real-world applications because they capture a concept that is fundamental to our world: objects, processes, and events have spatial and temporal scope. Perceiving objects, processes, and events in the real world requires recognizing patterns that have both spatial and temporal qualities. Recurrent networks such as Recurrent Neural Networks (RNNs) and Long Short-Term Memory (LSTMs) can be thought of as state machines that use a trained network to compute the output and next state transition functions, given the current input and a (single) previous state variable. The idea of temporal feature scales in some embodiments is to increase the memory of the state machine, so that the output and next state functions can be dependent not only on the previous state but also on additional states further in the past. In some embodiments, there may be a register of previous state variables with taps at variable spaced points. This structure allows the network to remember its history at different time scales and decide its future behavior based on all of this collective information. This design pattern of some embodiments is referred to as temporal residual connections, because it allows information to propagate across different time scales.

Thus, some embodiments provide a method for executing a neural network that accounts for state data from multiple previous executions of the neural network for related inputs. For a current execution of the neural network, the network receives an input to the network (e.g., an image) as well as state data generated from at least two previous executions of the neural network for related inputs (e.g., previous images in a sequence of video images). The neural network is executed using the received input and state data from multiple previous executions to generate (i) a set of output data and (ii) state data to be used in subsequent executions of the neural network for additional related inputs (e.g., subsequent images in the sequence of video images).

The neural network, as is common, includes numerous nodes that receive input values (e.g., from other nodes of the network) and generate output values (e.g., to be provided to subsequent nodes of the network). In some embodiments, a subset of these nodes also generate output state data that is stored for a period of time and used as input state data to another subset of these nodes during subsequent executions of the neural network for subsequent inputs. In some cases, the nodes in the first subset (that generate the state data for storage) are the same as or at least partially overlap with the nodes in the second subset (that use the state data during subsequent executions of the neural network). Specifically, in some embodiments, the state data generated by a particular node during one specific execution of the neural network is used by the same particular node during subsequent executions of the neural network.

In other embodiments, the state data generated by a first node during one specific execution of the neural network is used by a second, different node during subsequent executions of the neural network. The second node may come prior to or after the first node within the execution of the neural network, in various different embodiments. For instance, the second (state-receiving) node might be several layers prior to the first (state-generating) node. These "deep learnable functions" are capable in some embodiments to make a more sophisticated decision on what the next state should be.

Different embodiments use state data from different previous executions of the neural network during a current execution of the neural network. For example, some embodiments use a periodic register that stores state generated from a particular number of previous executions of the network (e.g., the eight most recent executions), and use the state data from each of these previous executions for the current execution. Other embodiments, however, store state from a particular number of previous executions, but only use the state data from a certain subset of these previous executions for the current execution (e.g., storing each of the sixteen most recent executions, but using only the state data from the $1^{st}$, $2^{nd}$, $4^{th}$, $8^{th}$, and $16^{th}$ most recent executions).

Still other embodiments use a set of periodic registers, in which only the state from certain previous executions is stored for use by subsequent executions. For some such embodiments, each of the state-generating nodes generates state for each of multiple temporal scales. In each execution of the network, different registers store different subsets of this data. For instance, one register might store state generated by the nodes to be used for the next execution of the network during every execution of the network. Another register might store state generated for a second temporal scale every other execution of the network, while a third register stores state generated for a third temporal scale every fourth execution of the network.

Some embodiments provide a neural network inference circuit to execute the neural network by incorporating state data from multiple previous executions of the network. Such a neural network inference circuit of some embodiments includes a set of computation circuits configured to execute the various nodes of the neural network, as well as a set of memories that are configured to implement a register (e.g., a shift register or periodic register) that stores the state data from prior executions of the network. In some embodiments, the neural network inference circuit includes memories for storing weight values as well as input data and intermediate activation values (i.e., values that are inputs and outputs to nodes of the neural network), and a set of memory locations of these memories are designated to implement the shift register.

Different embodiments that use a shift register implement this shift register differently. In some embodiments, each of the memory locations designated for implementing the shift register corresponds to a particular previous execution of the neural network. For example, one of the memory locations will always store the state data generated for the immediately previous execution, another memory location stores the state data generated for the execution two prior, etc., up to the earliest execution for which state data is used. In this case, the state data is moved between memory locations during each execution of the neural network (e.g., moving the state data from the memory location for storing state data generated for the immediately previous execution to the memory location for storing state data generated for the execution two prior to the current execution). To save the power required for reading and writing to memory (the most power-intensive operation in many neural network inference circuits), some embodiments instead write the generated state data in a circular manner between the designated memory locations, while modifying, at each execution, a pointer that indicates which memory location corresponds to which previous execution of the network. Once the maximum number of executions for which state data can be stored is reached (e.g., the number of memory locations designated for the shift register), the state data for the next execution is written over the oldest stored state data.

As described above, the state data generated during a particular execution of the neural network may be generated by multiple nodes of the neural network. In some embodiments, this data is concatenated into a single set of state data for storage in the register (e.g., in a predefined format that designates a particular number of bits for the state data from each of the nodes). This concatenation may occur by holding the state data from each of the nodes in a cache prior to writing the entire set of state data for the particular execution to memory, or by simply storing all of the data in the same memory location in a sequential manner such that it can be retrieved from the memory in a single read operation. To provide the state data to the nodes of subsequent operations, some embodiments retrieve the state data from each of the prior executions and parse the data from each prior execution into its constituent pieces (e.g., for different nodes of the current execution of the neural network). In addition, some embodiments concatenate the data for each particular node of the current execution from the multiple prior executions into a single piece of data that is provided to the particular node (i.e., with a first concatenated set of state data from multiple executions for a first node of the current execution, a second concatenated set of state data from multiple executions for a second node of the current execution, etc.).

In some embodiments, a neural network with the above-described structure is used to improve video by removing noise from the video (e.g., a video stream). In some such embodiments, the input to each execution of the network is one of the video images (the video being a sequence of such video images). In this case, at least a subset of the nodes of the neural network identify spatial features (e.g., edges, shapes, textures, objects, colors, etc.) of the current input image, and some of these nodes store data about these spatial features for use in subsequent executions of the network (for subsequent images in the input video stream). That is, for analyzing and de-noising one image of the video, the neural network uses both its analysis of the current image as well as analysis of previous images. This analysis can be especially helpful to reduce noise in low-light video streams. Some embodiments additionally delay the output of a video stream (e.g., by several images) so that analysis of subsequent video images can inform the output of the initial video images.

Initially, the structure of a general feed-forward multi-layer machine-trained network will be described. FIG. 1 illustrates an example of a multi-layer machine-trained network of some embodiments. This figure illustrates a feed-forward neural network 100 that has multiple layers of processing nodes 102 (also called neurons). In all but the first (input) and last (output) layer, each node 102 receives two or more outputs of nodes from earlier processing node layers and provides its output to one or more nodes in subsequent layers. The output of the node (or nodes) in the last layer represents the output of the network 100. In different embodiments, the output of the network 100 is a number in a range of values (e.g., 0 to 1), a vector representing a point in an N-dimensional space (e.g., a 128-dimensional vector), or a value representing one of a pre-defined set of categories (e.g., for a network that classifies each input into one of eight possible outputs, the output could be a three-bit value).

In this example, the neural network 100 only has one output node. Other neural networks of other embodiments have several output nodes that provide more than one output value. Furthermore, while the network 100 includes only a few nodes 102 per layer, a typical neural network may include a varying number of nodes per layer (with some layers having several thousands or millions of nodes) and significantly more layers than shown (e.g., several dozen layers).

In addition, the neural networks of other embodiments may be types of networks other than feed forward networks (e.g., recurrent networks, regulatory feedback networks, radial basis function networks, aggregation networks, SRRNs, etc.). The illustrated network 100 is a fully-connected network in which each node in a particular layer receives as inputs all of the outputs from the previous layer. However, the neural networks of some embodiments are convolutional neural networks, in which the intermediate layers (referred to as "hidden" layers) may include convolutional layers, pooling layers, fully-connected layers, and normalization layers.

As shown in FIG. 1, each node in the neural network 100 has a linear component 110 and a nonlinear component 115. The linear component 110 of each hidden or output node in this example computes a dot product of a vector of weight coefficients and a vector of output values of prior nodes, plus an offset. In other words, a hidden or output node's linear operator computes a weighted sum of its inputs (which are outputs of the previous layer of nodes) plus an offset (also referred to as a bias). Similarly, the linear component 110 of each input node of some embodiments computes a dot product of a vector of weight coefficients and a vector of input values, plus an offset. In other embodiments, each input node receives a single input and passes that input as its output. Each node's nonlinear component 115 computes a function based on the output of the node's linear component 110. This function is commonly referred to as the activation function, and the outputs of the node (which are then used as inputs to the next layer of nodes) are referred to as activations.

The notation of FIG. 1 can be described as follows. Consider a neural network with L hidden layers (i.e., L layers that are not the input layer or the output layer). The variable l can be any of the hidden layers (i.e., $l \in \{1, \ldots, L-1\}$ index the hidden layers of the network, with $l=0$ representing the input layer and $l=L$ representing the output layer). The variable $z_i^{(l+1)}$ represents the output of the linear component of a hidden node i in layer l+1. As indicated by the following Equation (A), the variable $z_i^{(l+1)}$ is computed as the dot product of a vector of weight values $W_i^{(l+1)}$ and a vector of outputs $y^{(l)}$ from layer l multiplied by a constant value $c_i$, and offset by a bias value $b_i$:

$$z_i^{(l+1)} = \left(W_i^{(l+1)} \cdot y^{(l)}\right) * c_i + b_i^{(l+1)} = \sum_{k=1}^{n}\left(w_{ik}^{(l+1)} * y_k^{(l)}\right) * c_i + b_i^{(l+1)}. \quad (A)$$

The constant value $c_i$ is a value to which all the weight values are normalized. In some embodiments, the constant value $c_i$ is 1. The symbol * is an element-wise product, while the symbol • is the dot product. The weight coefficients $W^{(l)}$ are parameters that are adjusted during the network's training in order to configure the network to solve a particular problem (e.g., object or face recognition in images, voice analysis in audio, depth analysis in images, de-noising of images, etc.). In some embodiments, the training algorithm imposes certain constraints on the weight values.

The output $y^{(l+1)}$ of the nonlinear component 115 of a node in layer l+1 is a function of the node's linear component, and can be expressed as by Equation (B) below:

$$y_i^{(l+1)} = f(z_i^{(l+1)}). \quad (B)$$

In this equation, $f$ is the nonlinear activation function for node i. Examples of such activation functions include a sigmoid function 120 ($f(x)=1/(1+e^{-x})$), a tanh function 125, a ReLU (rectified linear unit) function 130 or a leaky ReLU function 135, as shown.

Traditionally, the sigmoid function and the tanh function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv:1502.01852, 2015. In some embodiments, the activation functions can be other types of functions, like cup functions and periodic functions.

Equation (B) can be expressed in the following expanded format of Equation (C):

$$y_i^{(l+1)} = f(z_i^{(l+1)}) = f\left[\left(\sum_{k=1}^{n} w_{ik} * y_k\right) * c_i + b_i^{(l+1)}\right]. \quad (C)$$

In this equation, $w_{ik}$ are weight values associated with the inputs $y_k$ of the node i in layer l+1.

Before a multi-layer network can be used to solve a particular problem, the network is put through a supervised training process that adjusts the network's configurable parameters (e.g., the weight coefficients of its linear components). The training process iteratively selects different input value sets with known output value sets. For each selected input value set, the training process typically (1) forward propagates the input value set through the network's nodes to produce a computed output value set and then (2) backpropagates a gradient (rate of change) of a loss function (output error) that quantifies in a particular way the difference between the input set's known output value set and the input set's computed output value set, in order to adjust the network's configurable parameters (e.g., the weight values).

The spatiotemporal networks of some embodiments (e.g., SRRNs) may have more complex connections than those shown in the network 100. For instance, within the spatial aspects of the neural network of some embodiments, outputs representing spatial features from multiple layers may be provided to another aggregation layer that also generates outputs representing spatial features. An aggregation layer, in some embodiments, is a convolutional layer that receives inputs from multiple other convolutional layers. In image processing, for example, such an aggregation layer might aggregate spatial features at different levels of resolution or different spatial feature scales, in order to provide additional spatial information.

Figure 2:
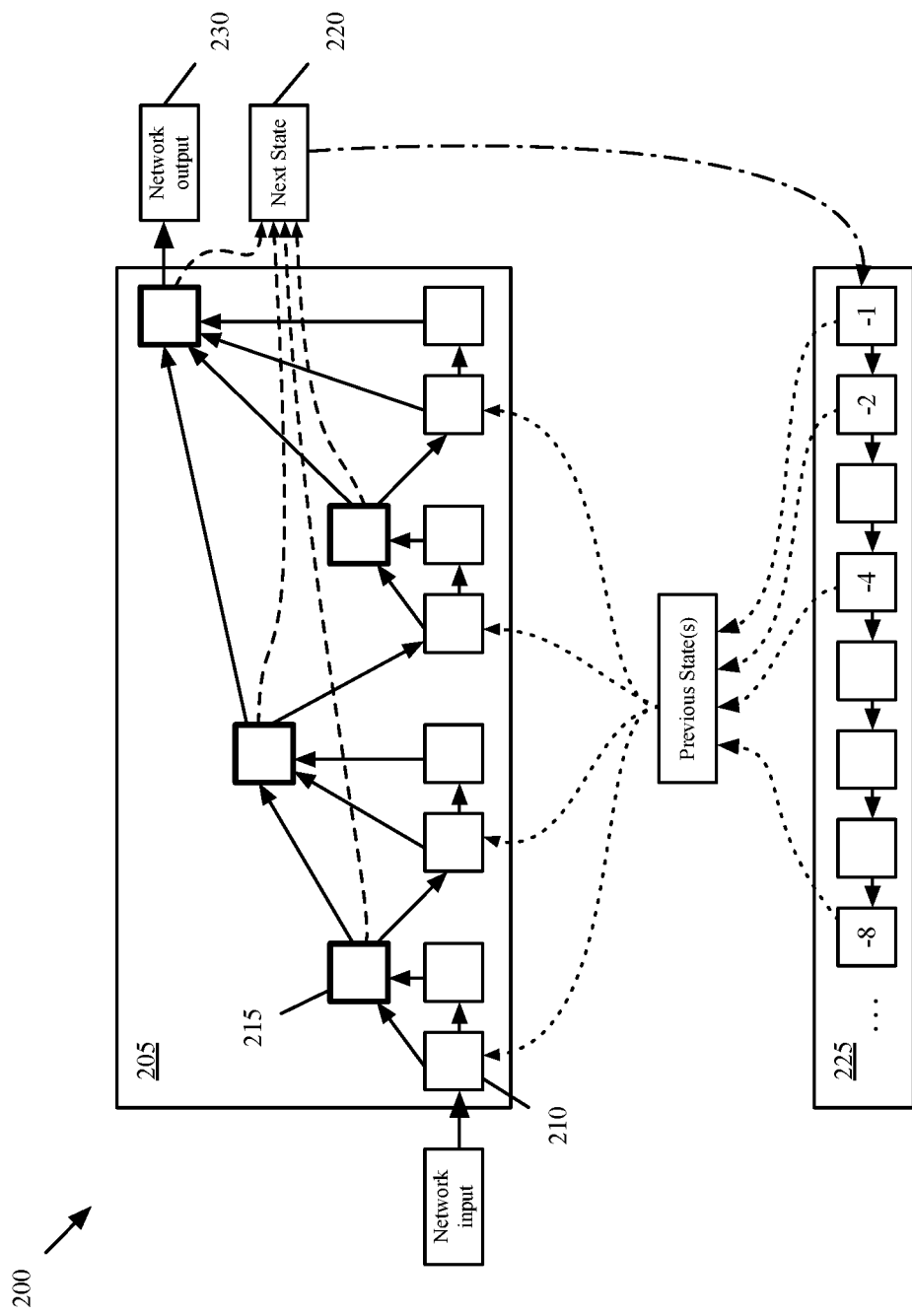
FIG. 2 conceptually illustrates a spatiotemporal residual recurrent network (SRRN) of some embodiments.

FIG. 2 conceptually illustrates a spatiotemporal residual recurrent network (SRRN) 200 of some embodiments. The SRRN network 200 includes two primary portions. The first such portion is a trained multi-layer recurrent neural network 205 that computes an inference output 230 and a next state variable 220, given the input and previous state data. As with a typical feed-forward or recurrent network, the multi-layer recurrent neural network 205 includes numerous learnable parameters (e.g., weight values, bias values, etc.). The second portion of the SRRN network 200 is a register memory 225 which stores previous states and feeds them back into the network 205 along temporal residual edges. In some embodiments, there are no learnable parameters in this portion 225 of the network 200. The next state variable 220 is stored in the register memory 225, as illustrated by the dot dash line.

In some embodiments, nodes or layers of the network 205 perform upsampling and/or downsampling. Upsampling design patterns include, in some embodiments, learnable upsampling with inverse convolution, non-learnable upsampling with nearest neighbor interpolation, non-learnable upsampling with bilinear interpolation, and pixel shuffle upsampling that reshapes tensors so that the channel dimension is flattened into increasing the size of the spatial dimension(s). Downsampling design patterns include, in some embodiments, maximum pooling, average pooling, nearest-neighbor decimation, learnable downsampling with convolution, and pixel shuffle downsampling that reshapes tensors so that spatial size is reduced and the channel dimension is increased, which is the same as representing a Bayer image as multiple separate channels, each of smaller spatial scale.

The neural network 205 includes backbone nodes 210, which in some embodiments are groups of trainable neural network layers that produce feature maps. It should be noted that each backbone node 210 in FIG. 2 represents one or more computation nodes as shown in FIG. 1 (and may also represent other types of nodes, such as an element-wise operation layer of element-wise computation nodes). That is, in some embodiments, each backbone node 210 represents one or more layers of multiple nodes.

Figure 3:
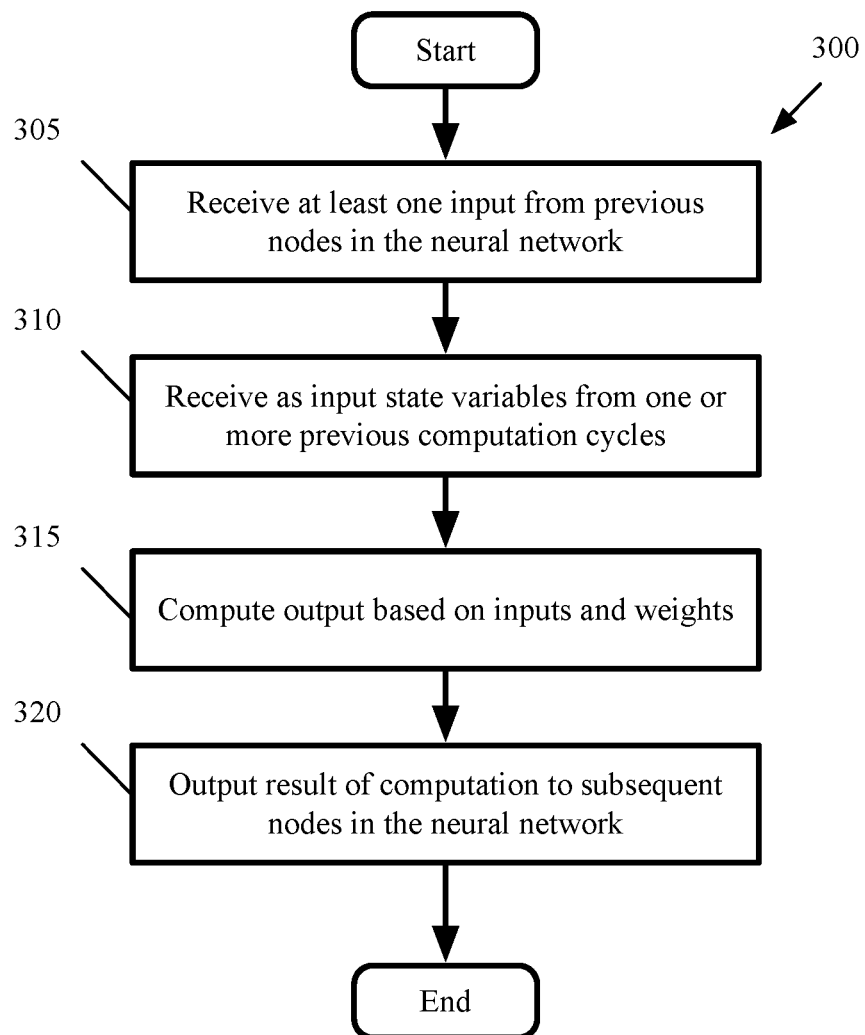
FIG. 3 conceptually illustrates a process performed to execute a state-receiving node of some embodiments.

FIG. 3 conceptually illustrates a process 300 performed to execute a state-receiving node of some embodiments. In the example of FIG. 2, these state-receiving nodes are backbone nodes 210. In other embodiments, however, the aggregation nodes 215 can be state-receiving nodes (in addition to or alternatively to the backbone nodes). Such a process 300, in some embodiments, might be performed by a neural network inference circuit in the process of executing a spatiotemporal neural network. The process 300 begins by receiving (at 305) at least one input from previous nodes in the neural network 205. These previous nodes in the neural network 205 can include backbone nodes and/or aggregation nodes, which may include other state-receiving nodes and/or state-generating nodes (which are described in more detail below). In some embodiments, if the state-receiving node is the first node or layer of the network 205, then the input is not from any node, but is instead the input to the network 205 as a whole (e.g., an image, an audio sample, etc.). The inputs to the backbone nodes shown in FIG. 2 represent numerous values in some embodiments. For instance, if two successive backbone nodes 210 represent different convolutional layers (each potentially having thousands, if not millions, of individual computation nodes), then the edge between them represents all of the activations output by the first layer and used as inputs to the second layer.

The process 300 also receives (at 310) a previous input state variable from one or more previous executions of the neural network 205 (e.g., the application of the neural network 205 to a previous input). This is illustrated in FIG. 2 by dotted lines from the register memory 225 to different backbone nodes 210. In some embodiments, the previous input state variable provided to each state-receiving node includes data from a single state-producing layer of the network (e.g., a backbone node or an aggregation node), or may include data combined from multiple state-producing layers. For instance, in the example network shown in the figure, the first backbone node 210 might receive only the state data generated by the first aggregation node 215, but from multiple prior executions of the network 205. In some embodiments, rather than providing all of the stored state data each time the network 205 is executed, the register memory 225 provides a subset of the previous state data (e.g., state data for every other previous execution, state data for previous executions that are powers of 2 prior to the current execution as shown in the figure, etc.).

The process 300 computes (at 315) an output for the state-receiving node based on the received inputs (including the state data). As the nodes that execute a process such as shown in FIG. 3 actually represent one or more layers of computation nodes, the output computed by the backbone node in some embodiments is actually many separate outputs of the many computation nodes. In some embodiments, the state-receiving nodes are convolutional layers (or combinations of layers that include one or more convolutional layers), in which case trained weight values are also used to compute the output of each computation node.

Finally, the process 300 provides (at 320) the output of the state-receiving node to subsequent nodes in the neural network. The process 300 then ends. In some embodiments, the output (i.e., many output values) are output to other state-receiving nodes, state-generating nodes (described further below), nodes that do not generate or receive state, or a combination thereof. For instance, as shown in network 205, the output of the first backbone node 210 is provided to both an aggregation node 215 as well as another backbone node (which does not receive state data), while the output of the second backbone node is only provided to the aggregation node 215. Further, in certain networks (not the network shown in FIG. 2), a backbone node that receives state data may be the final node of the network, in which case the output of the node is the network output.

In the example shown in FIG. 2, the structure of network 205 is that of an aggregation network, which is a type of stateless network that uses spatial residual connections to propagate information across different spatial feature scales. Information from different feature scales can branch-off and re-merge into the network in various patterns, so that computational capacity is better balanced across different feature scales. In the example network 205, two backbone nodes (having different feature scales) both provide their outputs to the same aggregation node, which allows for the aggregation node to analyze both of these feature scales. Also, the network can learn an aggregation function to merge (or bypass) the information instead of using a non-learnable (or sometimes a shallow learnable) operation found in current networks.

In some embodiments, the architecture of the aggregation network is a deep aggregation u-net architecture. This architecture allows information to skip forward on edges across different channel feature scales in the same way that scale aggregation edges allow information to skip forward across different spatial feature scales. One potential issue with such a network topology is that the fine detail spatial feature scale residual edges often skip over most of the network and therefore receive relatively little computational capacity compared to the coarse spatial feature scales. Because the fine detail spatial feature scales are important to create sharp output (e.g. discontinuities between foreground and background objects) and include more information than the coarse spatial feature scales, other embodiments use a different or modified architecture in which the fine detail feature scales receive more of the network's computational capacity.

In some embodiments, the architecture of the aggregation network architecture is a hierarchical aggregation network architecture. This architecture has hierarchical, tree-like network structures with aggregation nodes that allow residual information to be re-merged into the network at different spatial feature scales. These aggregation nodes may be referred to as "deep", in that they consist of several learned layers. In some embodiments, such a network can learn how to aggregate residual information in useful ways. The network 205 of FIG. 2 is an example of such a hierarchical aggregation network.

The aggregation network architecture, as mentioned, includes aggregation nodes 215, which in some embodiments are groups of trainable layers that combine information from different feature maps and pass it forward through the network, potentially skipping over backbone nodes. As with the backbone nodes, these aggregation nodes represent one or more layers of the neural network that aggregate data across multiple feature scales. Examples of the structures of aggregation nodes include channel-wise concatenation followed by convolution, element-wise addition (or multiplication) followed by convolution, and channel aggregation blocks.

Figure 4:
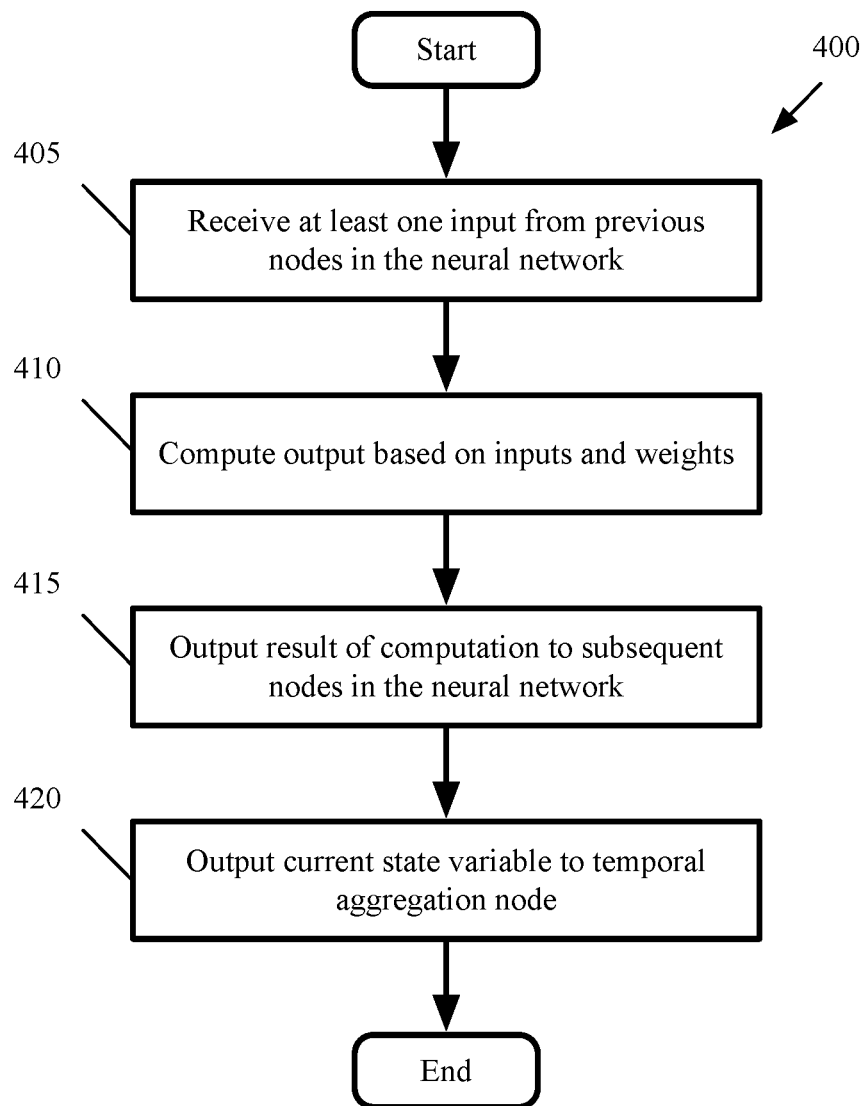
FIG. 4 conceptually illustrates a process performed to execute a state-generating node of some embodiments.

FIG. 4 conceptually illustrates a process 400 performed to execute a state-generating node of some embodiments. In the example of FIG. 2, these state-generating nodes are aggregation nodes 215. In other embodiments, however, the backbone nodes (i.e., nodes that are not aggregating over multiple spatial feature scales) can be state-generating nodes (in addition to or as an alternative to the aggregation nodes). In addition, it should be understood that in various different embodiments the nodes can perform any combination of aggregation over different spatial feature scales, state-consumption, and state-generation. That is, aggregation nodes that also receive state data from prior executions of the network could perform aggregation across both spatial and temporal dimensions.

Such a process 400, in some embodiments, might be performed by a neural network inference circuit in the process of executing a spatiotemporal neural network. The process 400 begins by receiving (at 405) at least one input from multiple previous nodes in the neural network. In the case of an aggregation node in the neural network 205, these previous nodes in the neural network may be a combination of backbone nodes and previous aggregation nodes in some embodiments. As with the state-receiving nodes, the inputs to the state-generation nodes shown in FIG. 2 represent numerous values in some embodiments. For instance, if each of the backbone nodes from which an aggregation node receives its inputs represents a convolutional layer (each having thousands, if not millions, of computation nodes), then each of the edges representing the inputs to the aggregation node could include thousands or millions of individual inputs to the aggregation node.

The process 400 computes (at 410) an output for the state-generating node based on the received inputs from multiple previous nodes. As noted above, aggregation nodes that execute a process such as shown in FIG. 3 actually represent one or more layers of computation nodes. These layers in some embodiments combine the multiple inputs to the aggregation node, e.g. concatenation layers or element-wise layers. The output computed by the aggregation node in some embodiments is actually many separate outputs of the many computation nodes of the last layer (e.g., a convolutional layer) of the aggregation node. In some embodiments, when the aggregation nodes also include convolutional layers, trained weight values are also used to compute the output of each computation node.

The process 400 provides (at 415) the output of the aggregation node to subsequent nodes in the neural network. In some embodiments, the output (i.e., many output values) are output to one or more backbone nodes, aggregation nodes, or a combination thereof. For instance, as shown in network 205, the output of the first aggregation node 215 is provided to both a backbone node as well as the next aggregation node. Further, in certain networks (as with the network 205), an aggregation node may be the final node of the network, in which case the output of the node is the network output (e.g., a modified image, a classification decision, etc.).

The process 400 also outputs (at 420) state data. The process 400 then ends. This state data, in some embodiments, represents certain aspects of the neural network state (e.g., spatial features) for the current execution identified by the aggregation node, propagated forward to subsequent executions of the network for related inputs (e.g., later video images in a video sequence). Some embodiments use a state computation node to compute the next state. This computation may be the identity function, where the state data is computed directly by the network. Alternatively, some embodiments compute the state data as a weighted average of prior state data and a value computed by the network.

The state variable 220 shown in FIG. 2 collectively represents the state data from all of the state-producing nodes of the network after the network output has been fully computed. In some embodiments, the state data is output by the process 400 to one or more temporal aggregation nodes (not shown) that accumulate the spatial state data from various state-producing nodes at different parts of the neural network 205 (e.g., at different spatial feature scales). This state data is aggregated (e.g., by the temporal aggregation nodes) to produce the next state variable 220, which is stored in the register 225. This is illustrated in FIG. 2 by dashed lines from the aggregation nodes 215 to the next state 220.

As noted above, in some embodiments, the state is aggregated using temporal aggregation nodes. These temporal aggregation nodes can perform channel-wise concatenation into the network at a matching spatial feature scale layer, or element-wise addition into the network at a matching spatial feature scale layer. In addition, they may perform gated or spatiotemporal aggregation in some embodiments. Gated aggregation is similar to element-wise addition, but with weights computed by a layer in the network. For spatiotemporal aggregation, the nodes have extra inputs to merge features from different spatial scales and from different times.

In some embodiments, the temporal aggregation nodes include one or more state-computing layers that execute in between the backbone and aggregation node computations. In some embodiments, a temporal aggregation node also executes at the end of the full execution of the network 205. As with any other layer or node, these temporal aggregation nodes take as input the output from preceding aggregation nodes and/or backbone nodes, perform computations on those inputs to compute the state, and then output the computed state to the state storage (e.g., a shift register). State computations result in components of the next state 220 but do not contribute towards the network output 230 in some embodiments.

In some embodiments, the state variables do not have to exist in a single location within the network 205. Unlike in LSTM architectures, which has a single layer that is responsible for computing the next state function, in an SRRN such as shown in FIG. 2, state can be remembered at multiple spatial feature scales and fed back into the network at the appropriate spatial feature scales. The next state variable 220 of some embodiments is a composite object produced in parts by different layers in the network 205. While the next state variable 220 is represented as a single datum conceptually for the purposes of shifting through the memory and propagating along temporal residual connections, in some embodiments the separate spatial components of this state can be produced and consumed at different places in the network (and may not be stored together in a neural network inference circuit that executes such a network). Furthermore, the next state variable 220 is typically different from the inference output 230 of the computation of the network 205 as a whole. In essence, the next state variable 220 is information for consumption during future computational cycles of the network 205 (e.g., identifying types of features at particular locations in the network), whereas the inference output 230 is information provided by the network 205 in the present (e.g., object classification, etc.).

As described, the network 205 (or another spatiotemporal network with a different network topology) computes state data with each pass (execution) of the network. This state data is stored in a shift register in some embodiments, so that subsequent executions of the network can access the appropriate state data from the register. State data is generated in such embodiments for each execution by multiple state-producing layers, concatenated, and stored in a location of the shift register. In some embodiments, the concatenation of state data from different state-producing layers is performed by spatial concatenation nodes. For use in subsequent executions of the network, the shift register has taps (e.g., at increasing spacing going backwards in time from a current execution). The state data from multiple prior executions is concatenated together, then split (e.g., based on spatial features) to be provided to different state-consuming layers during the current execution. In some embodiments, the concatenation of state data from different prior executions of the network is performed by temporal concatenation nodes.

Figure 5:
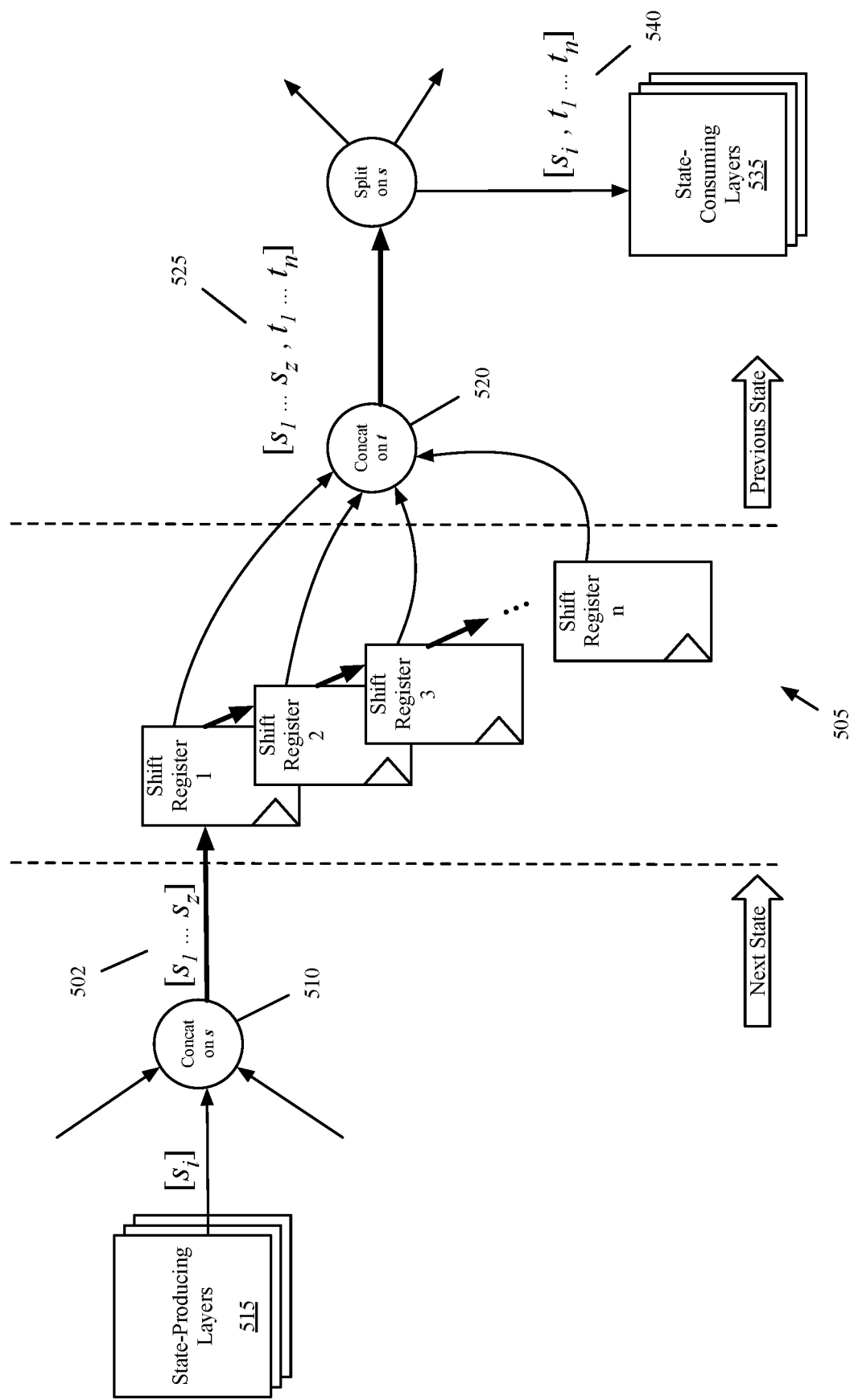
FIG. 5 conceptually illustrates the data flow into and out of a shift register of some embodiments.

FIG. 5 conceptually illustrates the data flow into and out of a shift register 505 of some embodiments. As shown, the figure also illustrates a set of state-producing layers 515, a spatial concatenation node 510, a temporal concatenation node 520, and a set of state-consuming layers 535. The spatial concatenation node 510 receives data, during a single execution of the network, from each of the state-producing layers 515 and concatenates this data to be stored in a first position of the shift register. The temporal concatenation node 520 receives data from the various different positions of the shift register and concatenates this data together for the various state-consuming layers 535.

Figure 6:
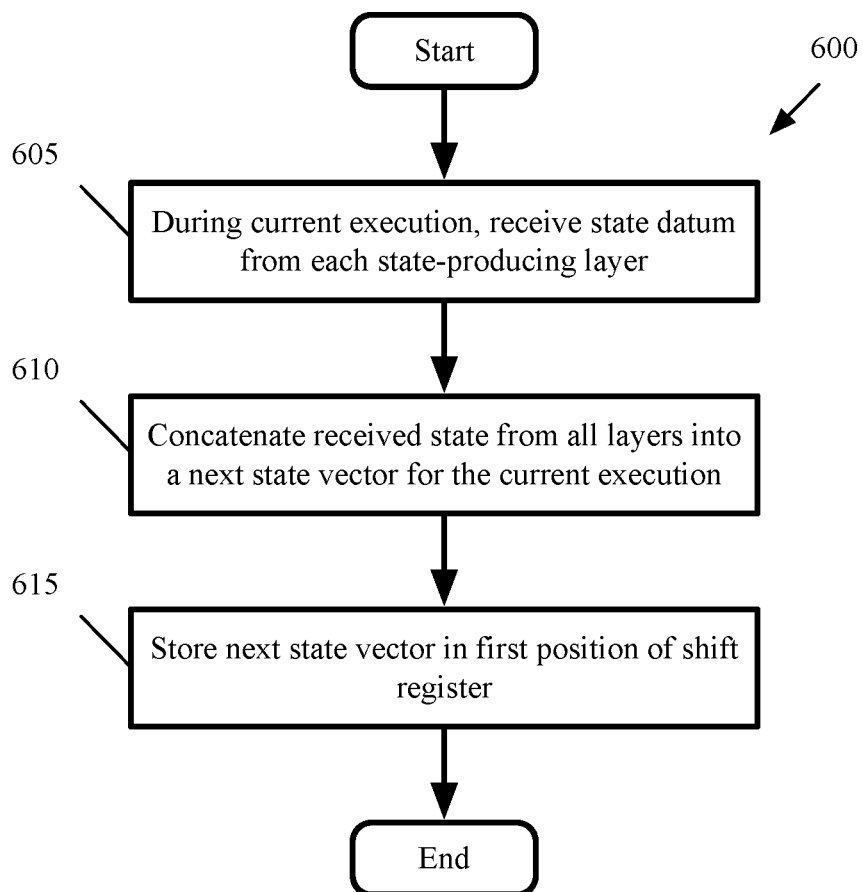
FIG. 6 conceptually illustrates a process of some embodiments that is performed by a spatial concatenation node to store state data from a set of state-producing layers of a network in a shift register.

FIG. 6 conceptually illustrates a process 600 of some embodiments that is performed by a spatial concatenation node (e.g., node 510) to store state data from a set of state-producing layer of a network in a shift register (e.g., register 505). The process 600 begins by receiving (at 605) a state datum $[s_i]$ from each state-producing layer of the network for a current execution of the network. Each of the different state-producing layers computes a state datum $[s_i]$ at a different spatial feature scale. The state datum that is produced is a function of the original input to the network for the current execution (as well as of previous state data fed into the network from the shift register).

The process 600 concatenates (at 610) the received state into a single next state vector $[s_1 \ldots s_z]$ for the current execution. The next state vector includes data representing or indicative of spatial features from all of the state-producing layers of the network, for the current execution of the network. As noted above, the next state vector 502 differs from the actual output of the network.

The process 600 stores (at 615) the next state vector in the first position of the shift register. The process 600 then ends. This first position is reserved for state data generated by the most recent execution of the network (i.e., for data incoming from the concatenation node), and therefore the process 600 writes the state data to this first position after each execution of the network. For the shift register to operate, the data from the execution of the network one instance prior is shifted into a second position of the shift register, and so on, until the data previously stored in the last position of the shift register is dropped.

The shift register 505 has a fixed number of register positions (e.g., 8, 16, etc.) to store state vectors from previous executions. In some embodiments, the shift register shifts the data from each position to the next, so that the state data stored in position 1 is moved to position 2, the state data stored in position 2 is moved to position 3, etc. This shift process is indicated by the arrows between positions in FIG. 5. The state values are shifted after each execution of the network in some embodiments, or in other embodiments just before each execution, depending on when other processes for storing state and retrieving state occur. Since the data is shifted every execution, the first position of the shift register corresponds to the previous execution, the second position corresponds to two executions prior, etc.

Figure 7:
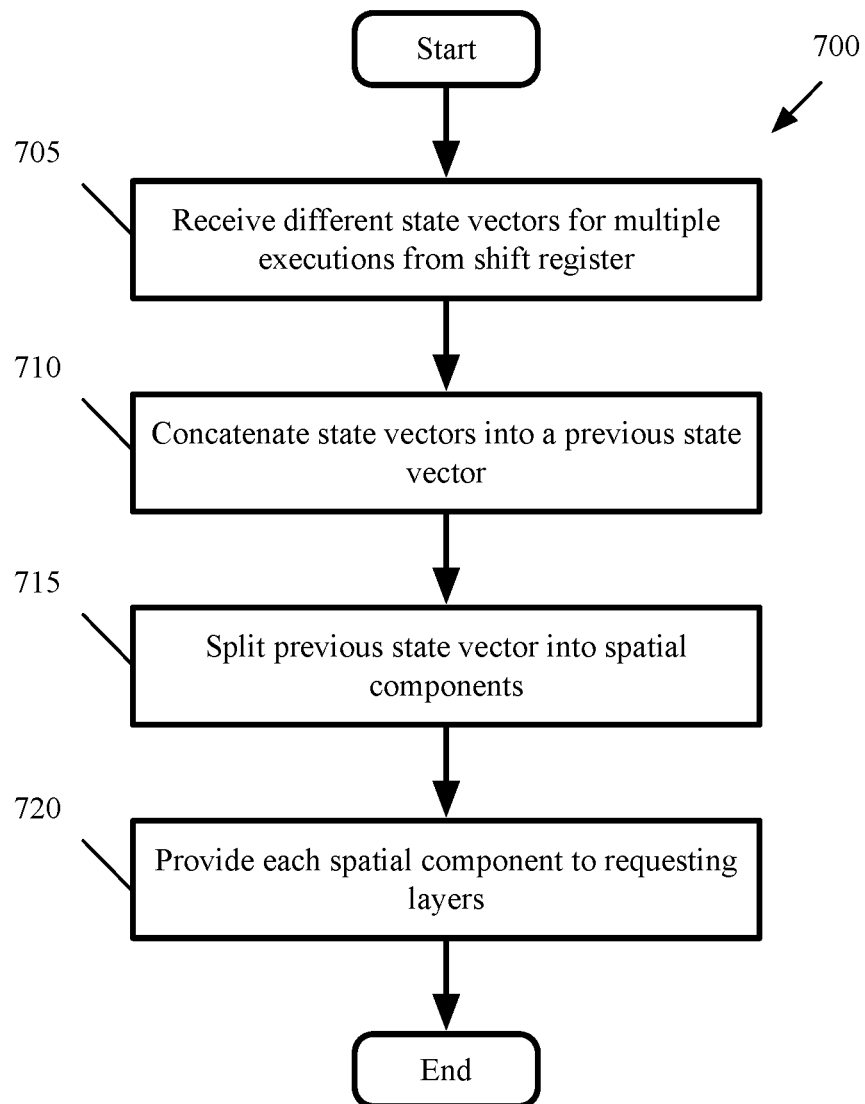
FIG. 7 conceptually illustrates a process of some embodiments that is performed by a temporal concatenation node to provide stored state data from a shift register to the state-consuming layers for a current execution of the a neural network.

FIG. 7 conceptually illustrates a process 700 of some embodiments that is performed by a temporal concatenation node (e.g., node 520) to provide stored state data from a shift register (e.g., register 505) to the state-consuming layers for a current execution of the a neural network. The process 700 begins by receiving (at 705) state vectors from taps in the shift register 505. Each of these different state vectors was stored in the shift register during different previous executions of the network, and includes state data representing multiple spatial feature scales (e.g., as concatenated by a spatial concatenation node 510). The taps have increasing spacing backwards in time in some embodiments. For example, the taps may be located (e.g., by design) at N=1, 2, 4, 8, etc. prior executions of the network (i.e., reading the state data from these prior executions of the network from their respective register positions). By increasing the spacing between taps in this fashion, the state data from older executions of the network (which are increasingly more numerous, as the size of the shift register increases) does not overwhelm the state data from more recent executions.

The process 700 concatenates (at 710) the state vectors from the previous executions into a single previous state vector $[s_i \ldots s_z, t_1 \ldots t_n]$. This previous state vector 525 includes state data for different spatial feature components $[s_i \ldots s_z]$ (corresponding to the different state-producing layers of the network) at different relative times $[t_1 \ldots t_n]$ (corresponding to the taps of the shift register, and thus to different prior executions of the network).

The process 700 splits (at 715) this concatenated previous state vector into different spatial components $[s_i, t_1 \ldots t_n]$. Each spatial component 540 includes state data for a specific spatial feature component $[s_i]$ (corresponding to a specific state-producing layer), at different relative times $[t_1 \ldots t_n]$ (corresponding to the taps of the shift register). This is because in some embodiments, a state consuming layer 535 of the network receives state data generated by a specific one of the state-producing layers. In some such embodiments, state-consuming layers 535 receive state data representing spatial features that were produced by state-generating layers that follow the state-consuming layers in the network. Accordingly, by splitting the previous state vector into spatial components, in some embodiments the state-consuming layers only receive the state that they need and are configured to use.

The process 700 provides at 720 each spatial component $[s_i, t_1 \ldots t_n]$ of the state data to the appropriate state-consuming layers 535 of the network. The specific spatial features that are consumed by a given layer 535 are in some embodiments determined by the network architecture and network training process. Each destination layer can receive some or all of the temporal residual connections that were tapped off the shift register 505. The process 700 then ends.

As noted above, each different state-producing layer 515 typically produces a state datum $[s_i]$ at a different spatial feature scale. In some embodiments, the state datum $[s_i]$ is fed back into the same layer that produced it. Alternatively or conjunctively, the state datum $[s_i]$ for a particular feature scale may be fed back into other state-consuming layers that are interested in previous state with that spatial feature scale. In some such embodiments, the state datum is consumed by at least one layer that precedes the layer which created it.

It should be noted that the spatial and temporal concatenation nodes 510 and 520 are conceptual, and actual concatenation of this sort is not necessarily performed in a neural network inference circuit that implements a spatiotemporal network of some embodiments. For example, the state data generated by different layers may not actually be stored together in such a circuit (though the state data from the same layer in multiple prior executions might be stored together for use by the same layers in the next execution of the network). Instead, some embodiments store the state data for use by a first layer of the network (in subsequent executions) in a same portion of memory that the input values for that first layer are stored (which may be generated by a second layer of the network during execution).

Different embodiments implement the shift register 505 in the memory of a neural network inference circuit in different ways. For instance, some embodiments associate each memory location (e.g., a RAM word, group of words, RAM bank, etc.) or set of memory locations assigned to the shift register with the state data for a particular prior execution of the network relative to the current execution. In this case, the state data is moved between these memory locations for each subsequent execution. Other embodiments, however, store each set of state data (i.e., the state data from a particular execution of the network) in a fixed memory location, and store a pointer or other reference that indicates which memory location corresponds to which prior execution relative to the current execution. Using this second scheme avoids the need to read and write each set of state data to and from memory during every execution of the network. The storage of state data in a neural network inference circuit of some embodiments will be described in further detail below.

Different variants of shift registers are also possible in some embodiments. For example, time-delayed shift registers update periodically for each cell in different rows. Reducing shift registers update each cell with a non-linear reduction or distillation of a set sequence of previous states. For conditional shift registers, the first cell is always updated with the last state, while all the other cells are updated conditionally based on either a set of predefined conditions or an equivalent set of learned conditions.

A periodic register is an alternative state storage technique of some embodiments that uses individual state registers operating on different temporal scales instead of a shift register. The periodic register uses less memory (e.g., of an inference circuit that executes the neural network) because it only has one state element per temporal residual edge, instead of using a long shift register with several unused taps. The periodic register also has an advantage over a shift register in that the network can learn to compute different functions of the state data during each execution, for use at different temporal feature scales.

Figure 8:
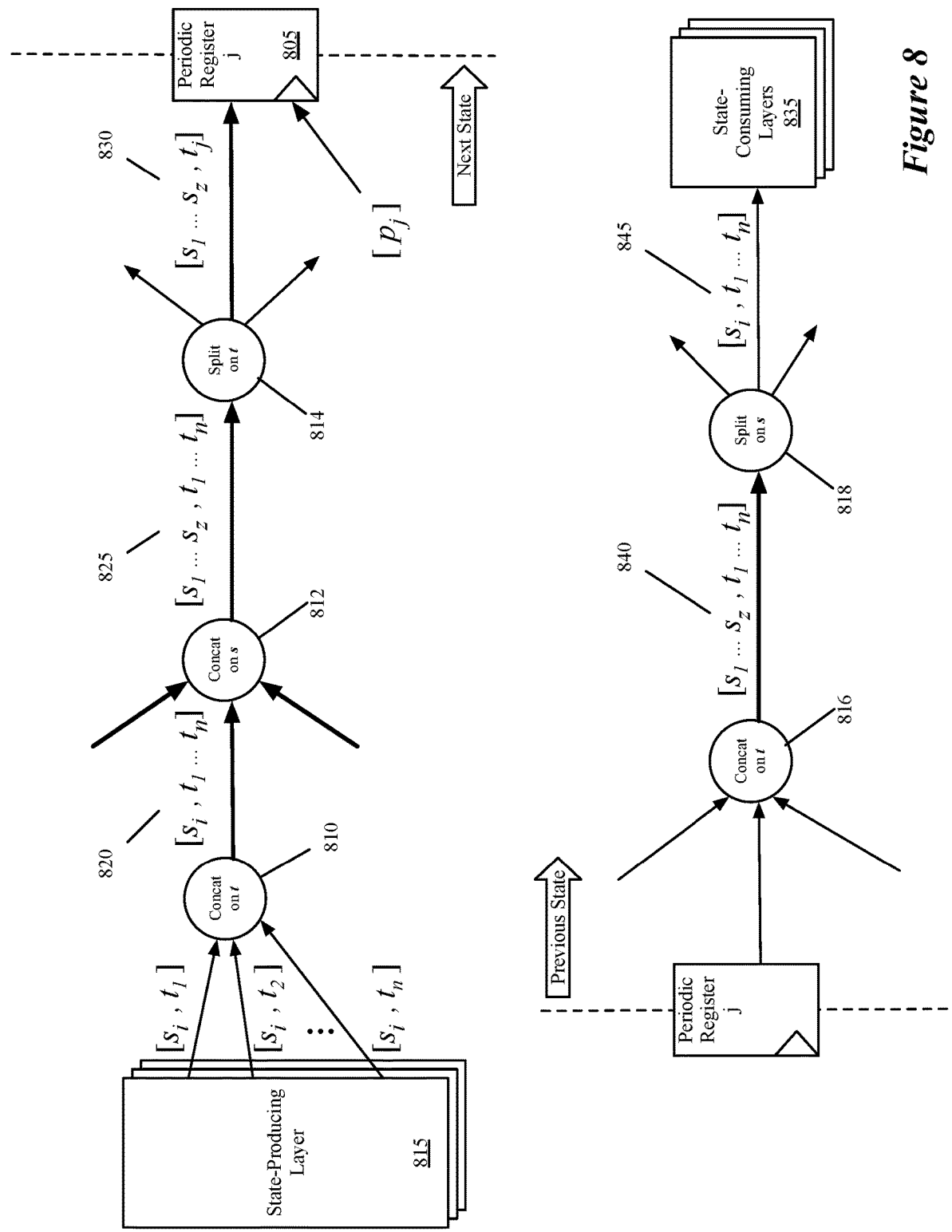
FIG. 8 conceptually illustrates the data flow into and out of such a periodic register of some embodiments.

FIG. 8 conceptually illustrates the data flow into and out of such a periodic register 805 of some embodiments. As shown, the figure also illustrates a set of state-producing layers 815, a set of write-side temporal concatenation node 810, a spatial concatenation node 812, a temporal split node 814, a read-side temporal concatenation node 816, a spatial split node 818, and a set of state-consuming layers 835. During execution, each state-producing layer generates data for multiple temporal scales, which is concatenated by each of a set of write-side temporal concatenation nodes 810. Each layer's generated state data is concatenated by the spatial concatenation node 812, and this combined set of data is split temporally by the temporal split node 814 for output to different periodic registers (with different periods). To provide data to the state-consuming layers 835, the periodic registers output their stored state to a temporal concatenation node 816, and this state is split spatially by the spatial split node 818 for provision to the different state-consuming layers 835 (each of which receives state from the multiple temporal scales at different spatial scales).

Figure 9:
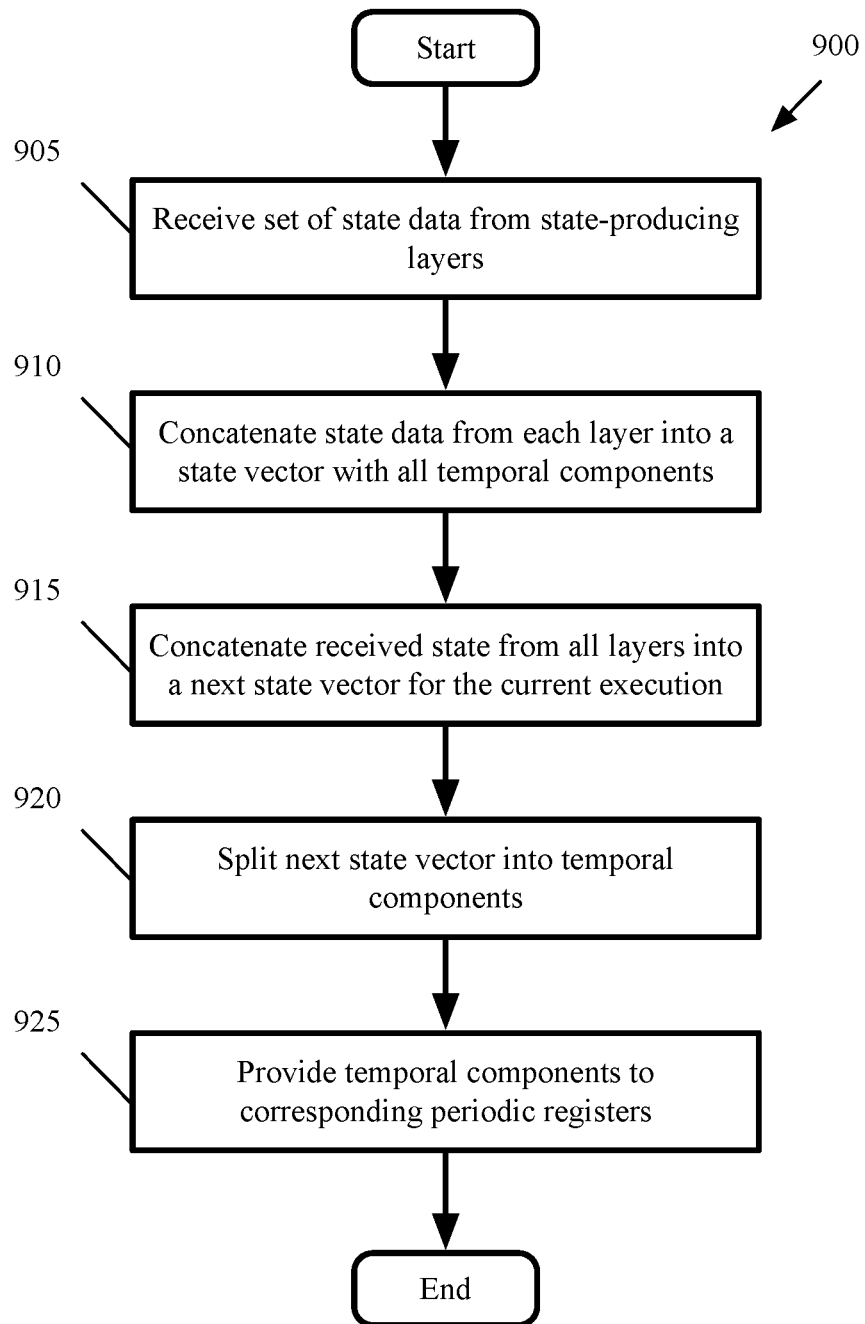
FIG. 9 conceptually illustrates a process of some embodiments to store state data from a set of state-producing layers of a network in a periodic register.

FIG. 9 conceptually illustrates a process 900 of some embodiments to store state data from a set of state-producing layers (e.g., layers 815) of a network in a periodic register (e.g., register 805). In some embodiments, the process 900 is performed by a set of concatenation and data-splitting nodes (e.g., the nodes 810-814) during (and/or immediately after) a current execution of the neural network.

As shown, the process 900 begins by receiving (at 905) state data the state-producing layers of the network 205. Each time the network is executed of the network, a given state-producing layer computes a different state datum $[s_i, t_j]$ for each different temporal feature scale of interest. Each state datum that is produced is a function of the input to the network for this current execution of the network, as well as any state data that has been input to the network at or previous to this state-producing layer. The process 900 concatenates (at 910) the set of state data received from each of the state-producing layers, to create a state vector $[s_i, t_1 \ldots t_n]$. This state vector 820 contains state data generated at state-producing layer 815 for all temporal feature scales. In some embodiments, this operation is performed by each of multiple write-side temporal concatenation nodes 810 (i.e., one for each state-producing layer 815). In some such embodiments, each of the write-side temporal concatenation nodes actually performs this at a different time (i.e., after each of the respective state-producing layers has generated its state data).

The process 900 also concatenates (at 915) the state vectors from each of the state-producing layers in the network into a single next state vector $[s_1 \ldots s_z, t_1 \ldots t_n]$. This next state vector 825 includes spatial and temporal features from all of the state-producing layers for the current execution of the network. This operation, in some embodiments, is performed by the spatial concatenation node 812 of the periodic register data flow. As noted above, this next state vector 825 differs from the actual output of the network.

Next, the process 900 splits (at 920) the next state vector 825 into separate temporal component vectors $[s_1 \ldots s_z, t_j]$. Each temporal component vector 830 includes state data from each of the state-producing layers $[s_1 \ldots s_z]$ that was produced by that layer for the temporal feature scale $[t_j]$. This operation, in some embodiments, is performed by the temporal data-splitting node 812 of the periodic register data flow. As noted above, each of these temporal feature scales corresponds to one of the periodic registers 805.

Finally, the process 900 provides (at 925) each of the temporal components of the next state vector to its corresponding periodic register. In some embodiments, each of the periodic registers receives a temporal component during each execution of the network. However, these registers are configured to actually overwrite their stored data at different rates. For instance, a first register (for the temporal scale of a single neural network execution) overwrites its data each time the network executes. The next register overwrites its data every other time the network executes, while a third register might overwrite its data once every four times the network executes and a fourth register overwrites its data every eight times (and so on). These registers can be in phase (i.e., so that every eighth execution of the network, all of these four periodic registers would overwrite their data) or out of phase (e.g., the fourth register that overwrites its data every eight executions could be out of phase with the third register that overwrites its data every four times, such that these registers never overwrite their data at the same time).

Figure 10:
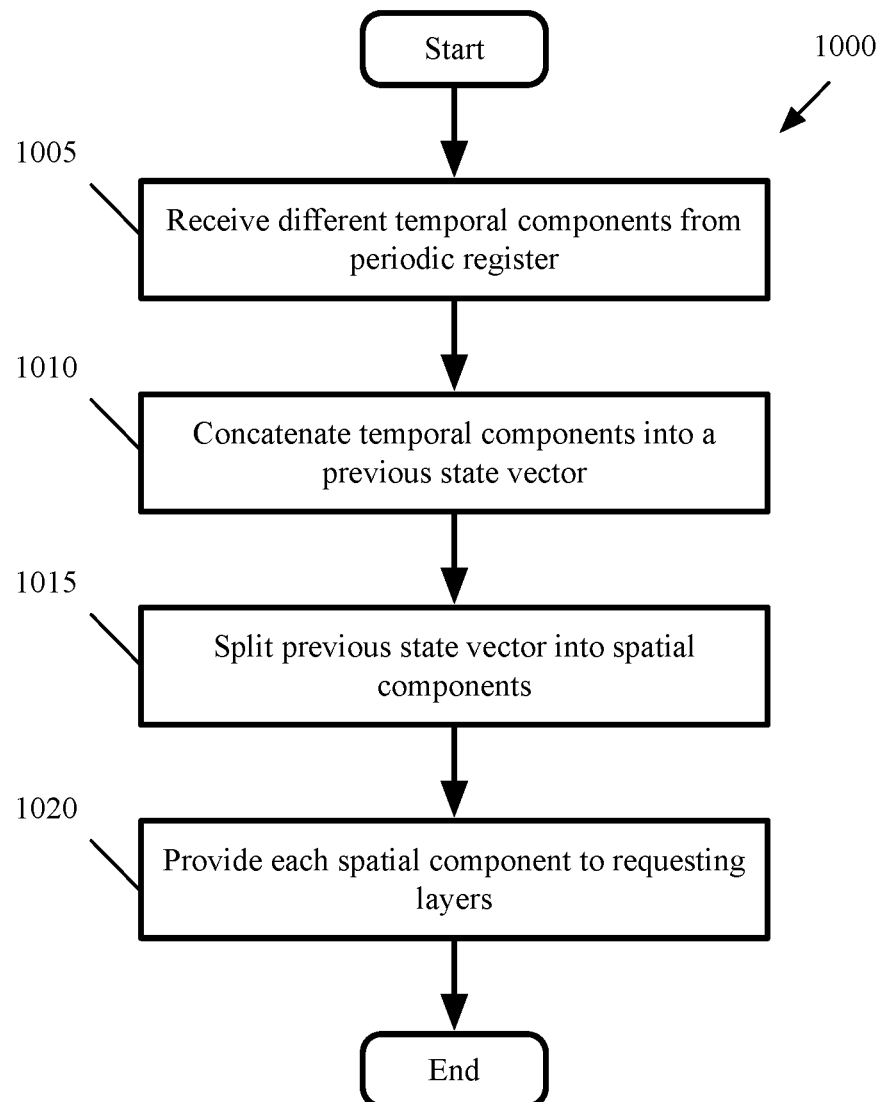
FIG. 10 conceptually illustrates a process of some embodiments to provide stored state data from a set of periodic registers to a set of state-consuming layers of a network.

FIG. 10 conceptually illustrates a process 1000 of some embodiments to provide stored state data from a set of periodic registers (e.g., the register 805) to a set of state-consuming layers (e.g., layers 835) of a network. In some embodiments, the process 1000 is performed by a set of concatenation and data-splitting nodes (e.g., the nodes 816 and 818) during a current execution of the neural network.

As shown, the process 1000 begins by receiving (at 1005) temporal components from a set of periodic registers. As described above, each of the periodic registers stores different state data corresponding to a different temporal scale. In some cases, multiple registers store (and output) state data that was stored during the same prior execution of the network, but generated for different temporal scales. In addition, as described above, each register stores (and outputs) state data for multiple spatial components (i.e., generated by multiple state-producing layers of the network during those prior executions of the network).

The process 1000 concatenates (at 1010) the temporal components into a single previous state vector $[s_i, \ldots s_z, t_1 \ldots t_n]$. This previous state vector 840 includes state data for different spatial feature components $[s_i, \ldots s_z]$ (corresponding to the state-producing layers) at different temporal feature scales $[t_1 \ldots t_n]$ (corresponding to the different periodic registers). The process 1000 then splits (at 1015) the previous state vector into different spatial components $[s_i, t_1 \ldots t_n]$. Each spatial component 845 includes state data for a specific spatial feature scale $[5,]$ (corresponding to a different state-producing layer) at different temporal feature scales $[t_i \ldots t_n]$ (corresponding to the multiple periodic registers). This is because in some embodiments, a state consuming layer 835 of the network receives state data generated by a specific one of the state-producing layers. In some such embodiments, state-consuming layers 835 receive state data representing spatial features that were produced by state-generating layers that follow the state-consuming layers in the network. Accordingly, by splitting the previous state vector into spatial components, in some embodiments the state-consuming layers only receive the state that they need and are configured to use.

The process 1000 provides (at 1020) each spatial component $[s_i, t_1 \ldots t_n]$ to the appropriate state-consuming layers of the network. The specific spatial features that are consumed by a given layer 835 are in some embodiments determined by the network architecture and network training process. The process 1000 then ends.

FIGS. 11A-B conceptually illustrates examples of state data stored in a set of periodic registers of different embodiments. State data from nine successive executions of a network is illustrated, which is stored in four periodic registers corresponding to different temporal feature scales (which are updated every 1, 2, 4, and 8 executions of the network). In the example, input S1 is a state vector 825 generated during the first execution, which has multiple temporal components 830 (denoted $S1_1$, $S1_2$, $S1_4$, and $S1_8$) that each correspond to one of the periodic registers. As described above with reference to process 900 in FIG. 9, each temporal component $S1_j$ of the state vector S1 includes concatenated spatial components generated for storage in the $j^{th}$ register by all the state-producing layers 815 of the network. Likewise, input S2 is a state vector 825 generated during the second execution of the network, which has multiple temporal components 830 (denoted $S2_1$, $S2_2$, $S2_4$, and $S2_8$) that each correspond to one of the periodic registers, and so on for the subsequent executions. In this example, the periodic registers correspond to temporal scales that approximate the immediately previous execution of the network, the second previous execution, the fourth previous execution, and the eighth previous execution, denoted P1-P4 accordingly.

In some embodiments, the state data from each execution is stored in each periodic register in phase, as illustrated in FIG. 11A. During the first execution of the neural network for a given set of inputs (e.g., a set of video frames from a stream), the state-producing layers compute the state vector S1 and this data is concatenated and provided to the registers as discussed above by process 900. All four of the periodic registers are enabled to store their received data during this execution of the network, so all of the inputs are stored. Accordingly, component $S1_1$ is stored in register P1, $S1_2$ is stored in register P2, $S1_3$ is stored in register P3, and $S1_4$ is stored in register P4.

During the second execution of the network, the state values {$S1_1$, $S1_2$, $S1_3$, $S1_4$} stored during the first execution are retrieved and sent to the state-consuming layers. The network computes and assembles a new state vector S2 during the second execution, based on the next input to the network and the received state values. During this execution, the first register P1 is again enabled to store its received data, as this register updates with every execution of the network. However, none of the other registers are enabled to store the data generated by the network. Therefore, even though state vector S2 is computed with components for all four registers (namely, $S2_1$, $S2_2$, $S2_4$, and $S2_8$), only component $S2_1$ is stored in P1. The values in registers P2-P8 are carried over from the previous execution.

During the third execution of the neural network, the state values {$S2_1$, $S1_2$, $S1_3$, $S1_4$} are retrieved and sent to the state-consuming layers 835. The network computes and assembles a new state vector S3 during the second execution, based on the next input to the network and the received state values. During this execution, the first register P1 is again enabled to store its received state data, as it updates with each execution of the network; the register P2 is also enabled to store state data, as this register updates with every other execution. Registers P4 and P8 are not enabled to update. Therefore, even though state vector S3 is computed with components for all four registers (namely, $S3_1$, $S3_2$, $S3_3$, and $S3_4$), only components $S3_1$ and $S3_2$ are stored in P1 and P2 respectively. The values in registers P4 and P8 are carried over from the previous execution.

In this manner, register P4 does not store its received state data again until the fifth execution of the network, and register P8 does not store its received state data again until the ninth execution. Because the inputs are in phase, all of the state data generated by the network every eight executions is stored in the periodic registers, whereas in intervening executions the state data for several of the temporal feature scales is not stored. As a result, the state data provided to the state-consuming layers each execution will have been generated during different numbers of previous executions. For instance, in the second (and tenth) executions of the network, all of the state data used will have been generated in the immediate prior execution, though for different temporal scales. On the other hand, in the ninth execution of the network, the state data output by each periodic register will have been generated during a different previous execution of the network.

For any given execution, the state data that is received by the neural network from the $j^{th}$ register is in some embodiments not necessarily from precisely j executions ago, but is instead from an execution that is no greater than j executions ago. For example, during the $7^{th}$ execution, register P4 provides as input the temporal component $S5_4$, which was actually only produced two executions prior.

FIG. 11B illustrates an example in which state data is stored in the periodic registers out of phase. The first two registers P1 and P2 are not affected by these phase concerns, since P1 is enabled to store state data every execution of the network and P2 is enabled to store data every other execution. However, in this case, the control signals for both P4 and P8 are offset by one and two executions, respectively. That is, rather than storing data from the first, fifth, ninth, etc. executions of the network, the register P4 stores state data from the second, sixth, tenth, etc. executions. Similarly, rather than storing data from the first, ninth, seventeenth, etc. executions of the network, the register P8 stores state data from the third, eleventh, nineteenth, etc. executions. The advantage of adding such phase offsets to the different registers is that this results in more diverse state (i.e., there are not situations in which all four of the registers store data from the immediately prior execution of the network). In some embodiments, this increased diversity may improve the inference output of the neural network for certain applications.

While the network structure (i.e., number and types of layers, connections between layers, which layers produce and consume state data, etc.) may be predetermined before training the network in some embodiments, the state data generation can be optimized during the network training process. That is, in some embodiments, the network learns how to utilize the resources allocated for state data during each execution of the network when the network is trained to perform a particular function (e.g., de-noising video streams). The state data is therefore a learned function optimized by the training process (i.e., the training process is used to determine how the network will generate state data to be used in subsequent executions of the network, for a given allocation of bits to the state data). As a result, this state data may not necessarily be human interpretable (i.e., it may not have a clear correlation to specific features in an image or other spatial features). In addition to learning how to generate the state data and what state data to store, some embodiments also learn (via training) how the state data is used (e.g., by training weight parameters that are used to combine the state data with inputs from previous network layers).

The residual recurrent networks of some embodiments may be used for various different purposes. It should be noted that spatial features generally refer to networks that process images (e.g., for classification, image modification, etc. purposes), but that different layers in networks trained for other purposes could generate other types of state data that is stored for multiple executions in a similar manner.

Figure 12:
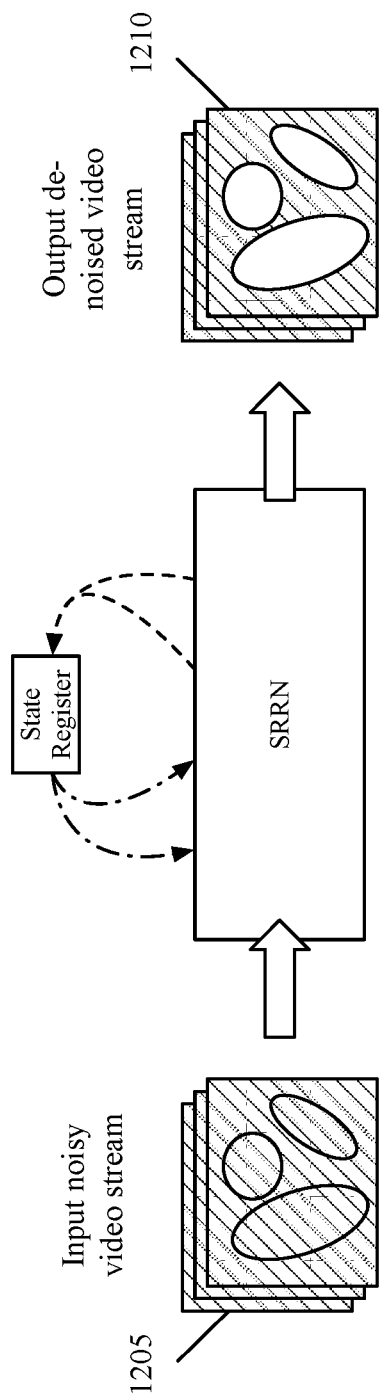
FIG. 12 conceptually illustrates the application of a neural network of some embodiments to a low-light video stream.

One example of a use case for networks of this type removing noise from video streams in low-light environments. FIG. 12 conceptually illustrates the application of such a network to a low-light video stream according to some embodiments. This "see in the dark" scenario takes as input a noisy video stream 1205 (i.e., sequential frames of video) that is recorded with low light, and the network uses state data from multiple spatial and temporal resolutions to output a de-noised video stream 1210 that is brightened and has higher signal to noise ratio than the source video.

For any given input frame, different objects will have different sizes and recognizable outlines and information. Real-world objects have spatial and temporal consistency (i.e., objects typically do not change location instantly). For example, the night sky has a very large spatial scale and low signal, whereas a face or a walking person have smaller spatial scales and outlines that the network can be trained to recognize. In addition, these objects have different temporal scales. For example, the night sky will change slowly over time (if at all during the course of a video stream), whereas faces may change expression but not outline, and a walking person will change quickly and have variable outline between frames of video. The sky, the face, and the walking person therefore all have different spatiotemporal features, and information from different frames can be used to remove noise in different ways (e.g., averaging or interpolation) tailored to these differing spatiotemporal features.

For example, if an object is not moving from frame to frame, the network in some embodiments remembers what the object looked like in previous frames, and uses that to compute an average across the frames, in order to average out the noise over time. For an object that does not move, the network might only remember the spatial location of where the object was and remember what the object looked like in previous frames. For an object that is moving, the amount of time over which the network must remember what the object looks like is shorter, since the object is changing. Thus, the network may learn what objects are moving slowly, what objects are moving quickly, and what these objects look like. Further, in some embodiments the network determine how long is it sensible to remember what the objects look like versus recognizing that the objects are changing quickly enough that the history of what an object looked like in previous executions isn't applicable to how it looks in the current execution. These are examples of the kind of information that the network might encode into the state for use in future executions.

Figure 13:
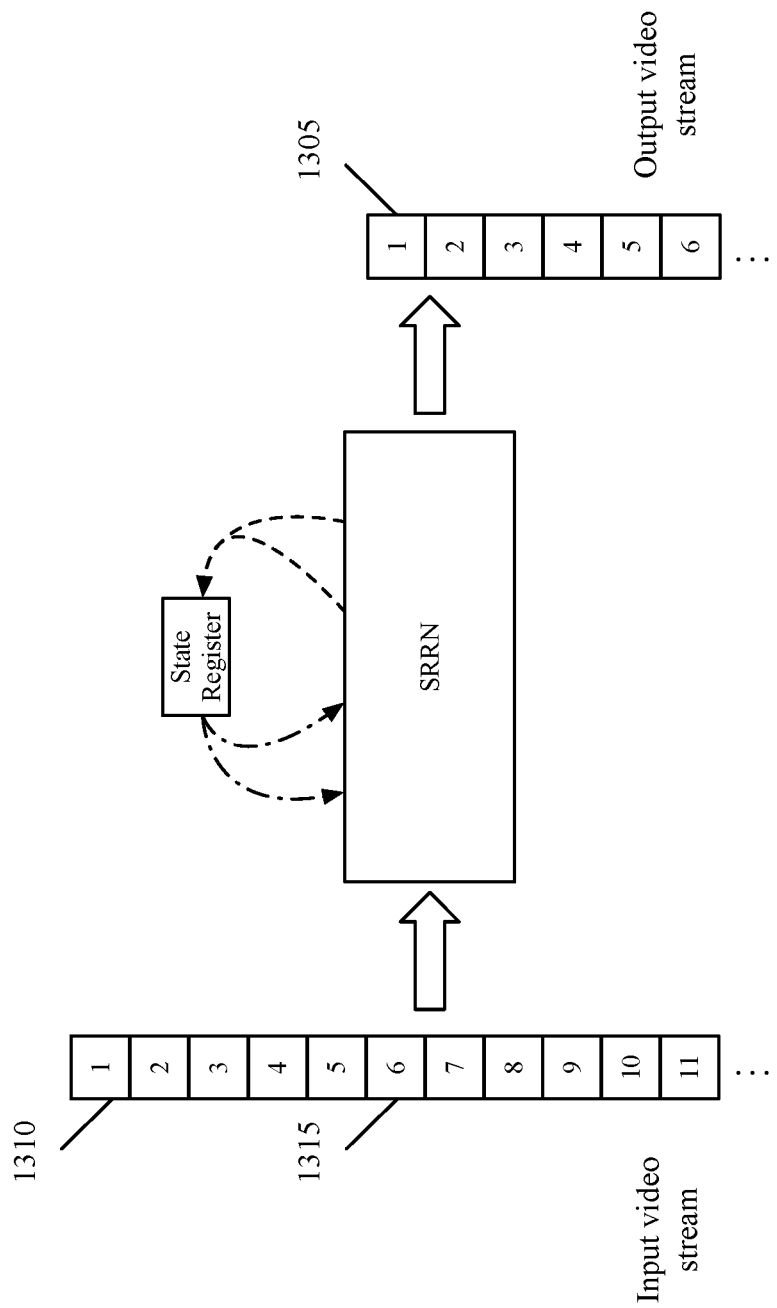
FIG. 13 conceptually illustrates an example of some embodiments where a deliberate latency is introduced between the input video stream and the output video stream instead of running the network in real-time.

In some embodiments, the neural network 205 processes an input video stream frame-by-frame, running continuously. Depending on the processing speed of the network, the output video stream may be produced in nearly real-time, synchronized relative to the input. However, the first video frame that is output in such a real-time scenario would not have any recurrent input from previous state. FIG. 13 conceptually illustrates an example of some embodiments where a deliberate latency is introduced between the input video stream and the output video stream instead of running the network in real-time. In this example, the output video stream has a latency of five frames (which can either be configured, or can be learned by the network). In other words, the first five input frames do not produce any output. Only after the sixth input frame is input does the network generate a de-noised output frame. The output frame 1 1305 is a de-noised version of input frame 1 1310 (not a de-noised version of input frame 6 1315). In essence, by introducing a latency between the input and the output, the network uses the information learned about the first five frames to improve the output of the processed first frame. This effectively allows the network to compute an output frame given not only the history of the preceding frames, but also some information about the subsequent video frames. The temporal behavior of objects in the relative past and the relative future of a given frame can be used to generate the output.

In some embodiments, during the course of pooling and convolutional operations, the resolution of the input data is reduced. For example, a video frame of size 1000×1000 may be reduced to feature maps of 10×10 size. The tree structure of the aggregation nodes continuously mixes local information from previous feature maps (e.g., high spatial resolution) with global information (e.g., lower spatial resolution). The aggregation nodes thus serve in some embodiments to mix local spatial decisions with global spatial decisions, and keep mixing that back with what was previously computed. Through these aggregation nodes that pass the higher resolution information through to the end of the network, the network is able to output a full resolution output (de-noised) video frame.

Other embodiments for video-based use cases include semantic segmentation (objects, instances, "stuff"), activity detection (running, walking, etc.) and object tracking between frames (since different moving objects have unique spatial and temporal profiles). Using stateful vision models may in some embodiments improve accuracy of object detection and tracking in real world scenarios (i.e. on video streams as opposed to single frames). Encoding and decoding of video via neural networks is another use case in some embodiments, for example using 4K and 8K video from cameras on mobile and consumer devices. Using neural networks for encoding and decoding may bring compression improvements but also offloading the computation from the CPU for better power consumption.

Further image/video use cases include image sensor identification (e.g., detecting different sensor makes and models, and detecting different sensors of the same make and model), camera noise modeling, and removing sensor dust spots (which introduces systematic noise, and will result in unique-shaped artifacts that are similar across multiple frames, that change appearance with different f-stop settings on the camera). For dust spots, the use cases can include drawing bounding boxes around dust spots, and pixel-to-pixel denoising.

Various embodiments for noise estimation use cases include predicting the relative exposure value (EV) of a static image or a video stream (given an input the network tries to predict how much overexposed or underexposed it is), predicting the peak signal to noise ratio (PSNR) of an input image, lens correction parameters, chromatic aberration correction (e.g., TCA correction coefficient), and white balance (temperature in degrees Kelvin on the blue/yellow axis, tint ratio on the magenta/green axis, red/blue equalizer coefficient for extreme lighting conditions, e.g. underwater), locating lens flares, and locating rain streaks (e.g. in near-infrared images). In addition, some embodiments include use cases for modeling photon shot noise, sensor read noise, pattern noise, thermal noise, amplifier glow, pixel response non-uniformity, and quantization error.

In some embodiments, another use case is audio denoising. Audio can be considered a time series of data (e.g., temporal features) and numerous components each of which have different "fingerprints" of frequency components (e.g., spatial features). Various applications of audio denoising using spatiotemporal features include removing wind noise from outdoor microphone recordings, removing systematic noise from low-quality recording setups (e.g. electrical noise), improve fidelity of low-bandwidth telephone audio to make it sound like high-quality audio, remove audio artifacts like feedback or echoing, removing vinyl noise artifacts for reconstruction of old recordings, and compressive audio sensing to recover high-quality audio signals from non-traditional microphones (e.g. laser vibration measurement, or bone conduction sensors).

Irrespective of the particular use case, in some embodiments the trained network may be compiled into a program for a specific type of integrated circuit (which can be embedded into a device). For instance, an integrated circuit (IC) configured to execute a network for low-light video de-noising could be embedded into a security camera, a personal video recording device (e.g., a smart phone), etc. The IC of some embodiments includes a set of input processing circuits, a neural network computation fabric that can be configured to apply a neural network (e.g., a spatiotemporal network) to an input value (e.g., a video frame), and a microprocessor (e.g., for controlling the input processing circuits and configuring the neural network computation fabric).

Figure 14:
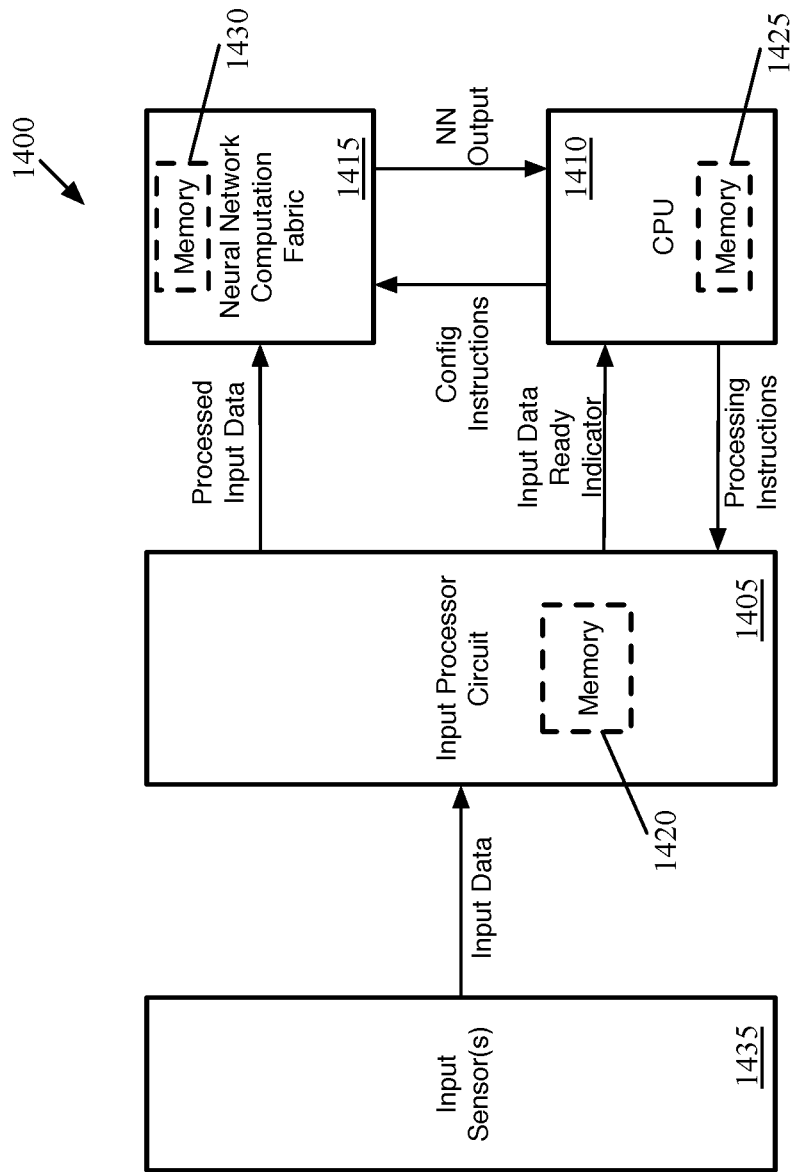
FIG. 14 conceptually illustrates an integrated circuit (IC) of some embodiments to execute the neural network.

FIG. 14 conceptually illustrates such an IC 1400 of some embodiments. As shown, the IC includes an input processor circuit 1405, a microprocessor (CPU) 1410, and a neural network computation fabric 1415. Each of these components 1405-1415 also has corresponding memory (e.g., random access memory (RAM)) 1420-1430. In addition, in some embodiments, the IC is integrated into a device (such as an Internet of Things (JOT) device) with one or more input sensors 1435. These input sensors can include cameras (e.g., for capturing video images on which the neural network computation fabric 1415 performs face or object recognition, etc.), microphones (e.g., for capturing audio on which the neural network computation fabric 1415 performs voice recognition, speech processing, etc.), or other types of input sensors. In other embodiments, the input sensors 1435 are located on a separate device that is linked with the IC 1400 (e.g., a video camera or set of video cameras that provide video streams to the IC).

In some embodiments, at bootup of the IC 1400, the CPU 1410 loads neural network configuration data (e.g., weight values, scale and bias parameters, lookup table masks for each layer, memory locations for the weight and input values to use for computing each layer of the network, etc.) from off-chip storage and generates instructions for the neural network computation fabric 1415 to write the weight values and other data to its memory 1430. In addition, the CPU 1410 loads the neural network program instructions for the computation fabric to its own memory 1425. These instructions are applied by the computation fabric 1415 to input data in order to execute the neural network. These runtime instructions include, e.g., indications as to which pre-loaded sets of instructions to use for each set of calculations, etc.

The input processor circuit 1405 receives input data (e.g., video frames or still images, sounds, etc.) from the input sensor(s) 1435, and processes these according to processing instructions received from the CPU 1410. The CPU 1410 stores in its memory instructions for the input processor circuit to prepare input data for the computation fabric 1415 as well as the neural network program instructions. These instructions for the input processor circuit 1405 identify, in some embodiments, any sort of initial processing to apply to the raw data (e.g., decompression of compressed data, etc.) as well as how to arrange the data to be provided to the computation fabric 1415. For an image, e.g., these instructions might specify the order in which the pixels should be arranged and streamed to the computation fabric 1415, so that the computation fabric stores this data in the appropriate locations of its memory 1430 for subsequent operations. The input processor circuit 1405 also sends signals to the CPU 1410 to indicate when it has fully buffered an input (e.g., a frame of video) and when the input is prepared to be sent to the computation fabric 1415.

In addition to instructing the input processor circuit 1405 how and when to provide input data to the computation fabric 1415, the CPU 1410 provides the neural network program instructions to the computation fabric. In some embodiments the CPU 1410 provides these instructions in stages (e.g., one layer or portion of a layer at a time). Once the final output of the neural network is computed, the fabric 1415 provides this output back to the CPU, so that the CPU (or other circuitry on the device) can evaluate this output and perform any actions based on the output.

The computation fabric of some embodiments provides a set of circuits for performing the various computations required for neural networks (e.g., dot product computations, scaler and bias operations, activation functions, etc.), with the network parameters (weight values, bias values, node arrangement, filter size, etc.) configurable. In some embodiments, the computation fabric imposes certain requirements on the networks, such as a maximum size of the network (i.e., a maximum size of the dot product computations), that the weight values be ternary (e.g., 0, α, and −α for each layer of the network), and/or that at least a particular percentage of the weight values be equal to zero.

Figure 15:
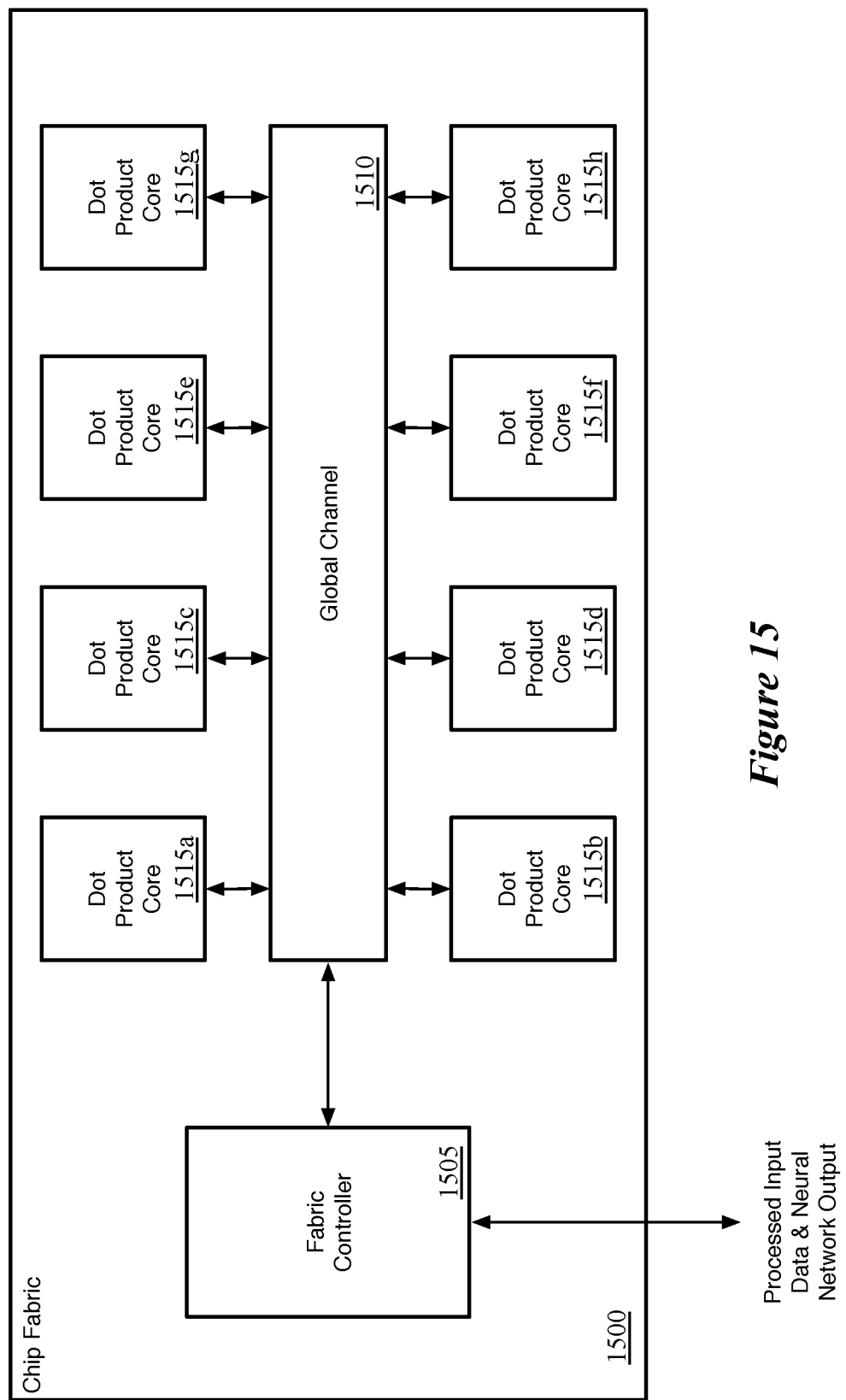
FIG. 15 conceptually illustrates the neural network computation fabric (also referred to as the chip fabric) of some embodiments.

FIG. 15 conceptually illustrates the neural network computation fabric 1500 (also referred to as the chip fabric) of some embodiments. The chip fabric 1500 of some embodiments includes a fabric controller 1505, a global channel 1510, and a set of dot product cores 1515*a-h*. The connections between the various components 1505-1515 represent the flow of both control data (e.g., configuration data for a particular neural network layer) and computation data at runtime in some embodiments.

The fabric controller 1505 is responsible for managing the operation of the rest of the chip fabric 1500 (e.g., the dot product cores 1515) in some embodiments. The fabric controller 1505 loads instruction arguments (e.g., weight, activation value, and state data locations, which cores to use for a particular computation, etc.) from local memory (not shown) on the chip, maps instructions into a sequence of memory-mapped register writes, synchronizes the downstream controllers (e.g., controllers for the various cores 1515), etc. The instructions managed by the fabric controller 1505 are configured at compile time, in some embodiments, based on the parameters of the network being implemented by the chip fabric 1500. In some embodiments, the fabric controller 1505 interacts with the microprocessor of the IC as well.

The chip fabric also includes numerous dot product cores 1515 as well as a global channel 1510 that connects the cores, with these data processing circuits configured by the fabric controller (and a set of hierarchical control circuits, in some embodiments). These data processing circuits 1510 and 1515 operate to compute neural network operations in an efficient, low-power manner, according to the configuration data provided by the control circuits.

The dot product cores 1515*a-h* include circuitry for computing partial dot products in some embodiments. In some embodiments, this circuitry includes memory and/or buffers for storing weights and activations, controllers for reading these values out of memory, and adder trees for computing the partial dot products based on the weight and activation inputs.

The global channel 1510 is responsible for providing a communications bus for control and computation data between the fabric controller 1505 and the cores 1515, as well as from one core to another. The global channel 1510, among other operations, accumulates partial dot products from multiple cores when computing dot products that require more computations than can be performed in a single core, and performs post-processing on these dot products. In addition, the global channel 1510 carries activations (i.e., computation node outputs) after post-processing for storage (and for use as inputs to subsequent computation nodes) in other cores 1515. In some embodiments, the global channel 1510 includes an accumulating bus for accumulating the dot products and a non-computation bus for providing activations, weights, and other configuration data to the cores and other computation circuits. In some embodiments, the linear function post-processing and non-linear function for each neural network node are also performed by circuits in the global channel 1510.

The chip fabric 1500 of some embodiments computes numerous neural network computation nodes simultaneously, with the computation for one node often spread across multiple cores (and subsequently the global channel). In some cases, if a neural network layer is small enough, then computation for that layer may be confined to a single core 1515. However, if multiple cores are used for a given layer (any number of cores may be used in some embodiments), then each dot product computed for that layer is spread across all of the cores 1515 in use.

That is, for a dot product computed across more than one core 1515, each of these cores computes a partial dot product from a subset of the input values and weight values for the node, then provides these partial dot products to the global channel 1510. In some embodiments, a set of input values are used as the input to multiple nodes in a layer, so a core simultaneously computes the dot products of these input values with multiple sets of weight values. Similarly, a set of weight values (referred to as a filter, or filter slice when that filter is divided across multiple cores) are used as the weights for numerous nodes with different sets of input values, so in some embodiments the cores load sets of weight values once and then compute dot products of these weight values with numerous different sets of input values. Based on configuration data specifying which outputs from the cores are to be added together (and whether multiple partial dot products are required from the same core), the global channel 1510 aggregates these partial dot products to compute the complete dot product for each node, then applies various post-processing functions (e.g., bias, scale, and non-linear activation functions) to compute the output of each node.

As described in more detail in U.S. patent application Ser. No. 16/457,757, filed Jun. 28, 2019 and which is incorporated herein by reference, the input values and weight values for each layer of the neural network are stored in memories across one or more of the cores 1515. For a stateless network, the chip fabric is instructed (according to the neural network program) to store the input values for a particular layer in predefined locations in the memories of the appropriate cores during the execution of the previous layer (i.e., the layer that generates these input values as its output values).

When executing a stateful network such as described above, the state data is generated similarly to activation values, but stored in the memories for a longer time period (i.e., at least one execution of the entire network). If a state-generating first layer generates state data that is used in state-consuming second layer of the network, then the state data output during the execution of the first layer is stored across the memories of the cores that have been designated as active for the second layer (by the compiler that compiles the network into a program). This allows this state data to be combined with (i) state data from other previous executions of the network and/or (ii) activation values that are stored across the memories of the same cores during the execution of the second layer.

In such a neural network inference circuit of some embodiments, the shift register and periodic registers may be implemented slightly differently. In either case, some embodiments do not have a single memory location (or even set of memory locations) that stores the entire set of state data for a given execution of the network. Rather, the state data to be used for a first state-consuming layer (which will typically include state data from multiple different prior executions of the network) is stored across the memories of a first set of the cores that are active for the first state-consuming layer, while the state data to be used for a second state-consuming layer (also typically including state data from multiple different prior executions of the network) is stored across the memories of a second set of the cores that are active for the second state-consuming layer. While these two sets of cores will in some cases be the same set of cores, they may also be two different sets of cores (either overlapping or not overlapping).

For example, in the design of the network in FIG. 2, state data generated by the first aggregation node 215 is consumed by the first backbone node 210. In this case, when the network executes the state generation portion of the first aggregation node 215, this data is routed to and stored in the memories of the set of cores that also store the inputs and weights for backbone node 210.

For a shift register, some embodiments designate (for each set of state data used by a particular layer) a particular number of specific memory locations, each of which is for holding the state data from a single prior execution of the network. The configuration instructions that control the operation of the cores and global channel are used to identify (i) to which of these memory locations the state data generated by the current execution of a state-producing layer will be written and (ii) which memory corresponds to which previous execution for the current execution of a state-consuming layer. These pointer values are cycled through in tandem so that each set of state data is used correctly and the oldest set of state data is overwritten in some embodiments. Such operations to store the new state data are repeated for each state-producing layer in some embodiments, each of which may store the generated state data across different sets of cores (depending on the cores that require the state data for use in state-consuming layers during subsequent executions of the network).

To implement a set of periodic registers, some embodiments designate (for each set of state data used by a particular layer) a specific set of memory locations to function as each periodic register. Each time a particular state-producing layer is executed, the circuit generates the state data for each of these periodic registers. For each of the periodic registers, this data is written to the corresponding set of memory locations every N executions of the network, while in the other operations the write operation is disabled. Some embodiments use control data based on the configuration instructions to enable/disable the write operation for different periodic registers. Such operations are repeated for each state-producing layer in some embodiments, each of which may store the generated state data across different sets of cores (depending on the cores that require the state data for use in state-consuming layers during subsequent executions of the network).

The integrated circuit of some embodiments can be embedded into various different types of devices in order to perform different purposes (e.g., face recognition, object categorization, voice analysis, etc.). For each type of device, a network is trained, obeying the sparsity and/or ternary constraints, with the network parameters stored with the IC to be executed by the IC on the device. These devices can include mobile devices, desktop computers, Internet of Things (IoT devices), etc.

Figure 16:
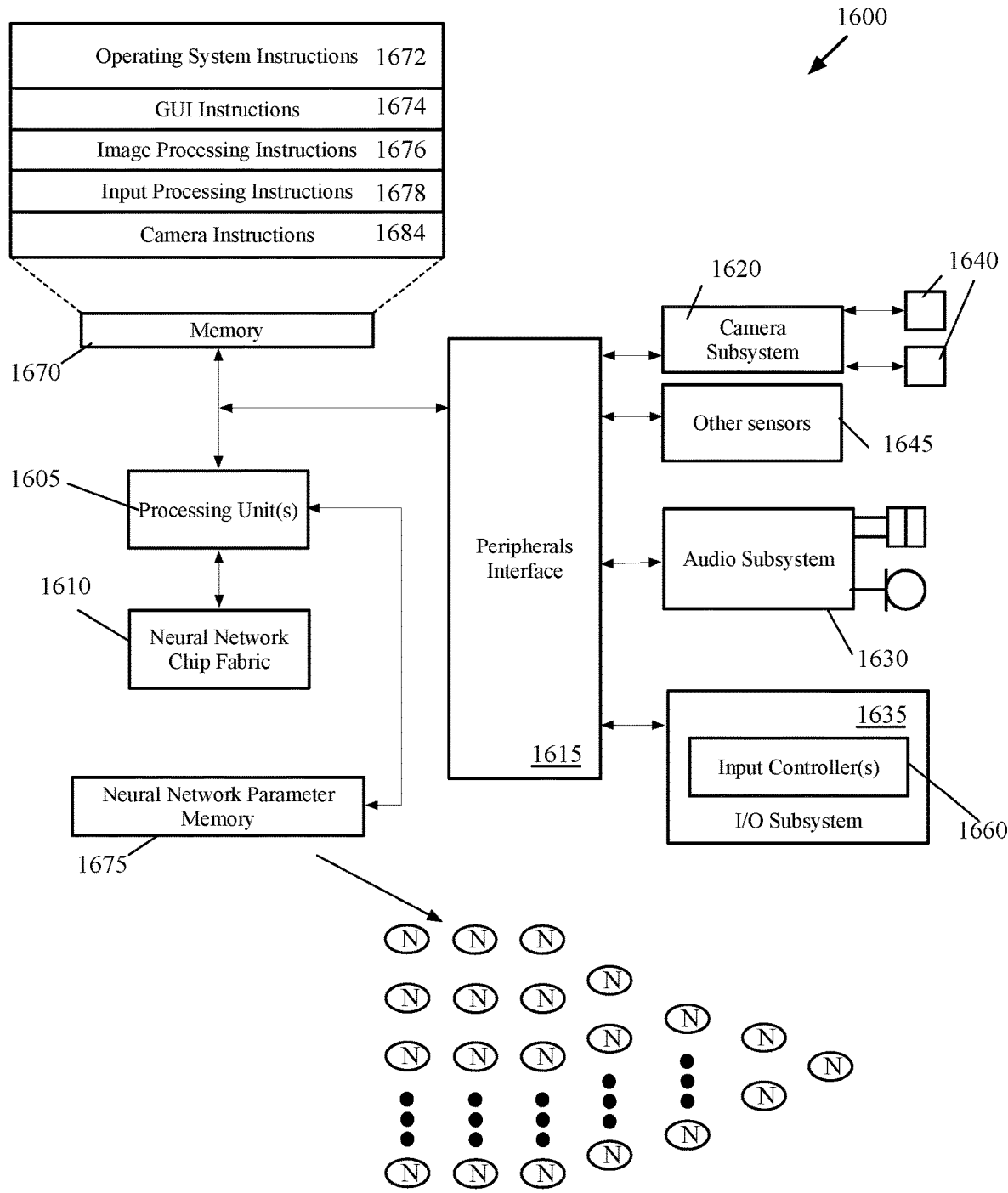
FIG. 16 is an example of an architecture of an electronic device that includes the neural network integrated circuit of some embodiments.

FIG. 16 is an example of an architecture 1600 of an electronic device that includes the neural network integrated circuit of some embodiments. The electronic device may be a mobile computing device such as a smartphone, tablet, laptop, etc., or may be another type of device (e.g., an IoT device, a personal home assistant). As shown, the device 1600 includes one or more general-purpose processing units 1605, a neural network chip fabric 1610, and a peripherals interface 1615.

The peripherals interface 1615 is coupled to various sensors and subsystems, including a camera subsystem 1620, an audio subsystem 1630, an I/O subsystem 1635, and other sensors 1645 (e.g., motion/acceleration sensors), etc. The peripherals interface 1615 enables communication between the processing units 1605 and various peripherals. For example, an orientation sensor (e.g., a gyroscope) and an acceleration sensor (e.g., an accelerometer) can be coupled to the peripherals interface 1615 to facilitate orientation and acceleration functions. The camera subsystem 1620 is coupled to one or more optical sensors 1640 (e.g., charged coupled device (CCD) optical sensors, complementary metal-oxide-semiconductor (CMOS) optical sensors, etc.). The camera subsystem 1620 and the optical sensors 1640 facilitate camera functions, such as image and/or video data capturing.

The audio subsystem 1630 couples with a speaker to output audio (e.g., to output voice navigation instructions). Additionally, the audio subsystem 1630 is coupled to a microphone to facilitate voice-enabled functions, such as voice recognition, digital recording, etc. The I/O subsystem 1635 involves the transfer between input/output peripheral devices, such as a display, a touch screen, etc., and the data bus of the processing units 1605 through the peripherals interface 1615. The I/O subsystem 1635 various input controllers 1660 to facilitate the transfer between input/output peripheral devices and the data bus of the processing units 1605. These input controllers 1660 couple to various input/control devices, such as one or more buttons, a touchscreen, etc.

In some embodiments, the device includes a wireless communication subsystem (not shown in FIG. 16) to establish wireless communication functions. In some embodiments, the wireless communication subsystem includes radio frequency receivers and transmitters and/or optical receivers and transmitters. These receivers and transmitters of some embodiments are implemented to operate over one or more communication networks such as a GSM network, a Wi-Fi network, a Bluetooth network, etc.

As illustrated in FIG. 16, a memory 1670 (or set of various physical storages) stores an operating system (OS) 1672. The OS 1672 includes instructions for handling basic system services and for performing hardware dependent tasks. The memory 1670 also stores various sets of instructions, including (1) graphical user interface instructions 1674 to facilitate graphic user interface processing; (2) image processing instructions 1676 to facilitate image-related processing and functions; (3) input processing instructions 1678 to facilitate input-related (e.g., touch input) processes and functions; and (4) camera instructions 1684 to facilitate camera-related processes and functions. The processing units 1610 execute the instructions stored in the memory 1670 in some embodiments.

The memory 1670 may represent multiple different storages available on the device 1600. In some embodiments, the memory 1670 includes volatile memory (e.g., high-speed random access memory), non-volatile memory (e.g., flash memory), a combination of volatile and non-volatile memory, and/or any other type of memory.

The instructions described above are merely exemplary and the memory 1670 includes additional and/or other instructions in some embodiments. For instance, the memory for a smartphone may include phone instructions to facilitate phone-related processes and functions. An IOT device, for instance, might have fewer types of stored instructions (and fewer subsystems), to perform its specific purpose and have the ability to receive a single type of input that is evaluated with its neural network.

The above-identified instructions need not be implemented as separate software programs or modules. Various other functions of the device can be implemented in hardware and/or in software, including in one or more signal processing and/or application specific integrated circuits.

In addition, a neural network parameter memory 1675 stores the weight values, bias parameters, etc. for implementing one or more machine-trained networks by the neural network chip fabric 1610. As mentioned above, different clusters of cores of the fabric 1610 can implement different machine-trained networks in parallel in some embodiments. In different embodiments, these neural network parameters are stored on-chip (i.e., in memory that is part of the neural network chip fabric 1610) or loaded onto the IC 1610 from the neural network parameter memory 1675 via the processing unit(s) 1605.

While the components illustrated in FIG. 16 are shown as separate components, one of ordinary skill in the art will recognize that two or more components may be integrated into one or more integrated circuits. In addition, two or more components may be coupled together by one or more communication buses or signal lines (e.g., a bus between the general-purpose processing units 1605 and the neural network IC 1610, which enables the processing units 1605 to provide inputs to the neural network IC 1610 and receive the outputs of the network from the IC 1610. Also, while many of the functions have been described as being performed by one component, one of ordinary skill in the art will realize that the functions described with respect to FIG. 16 may be split into two or more separate components.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 17:
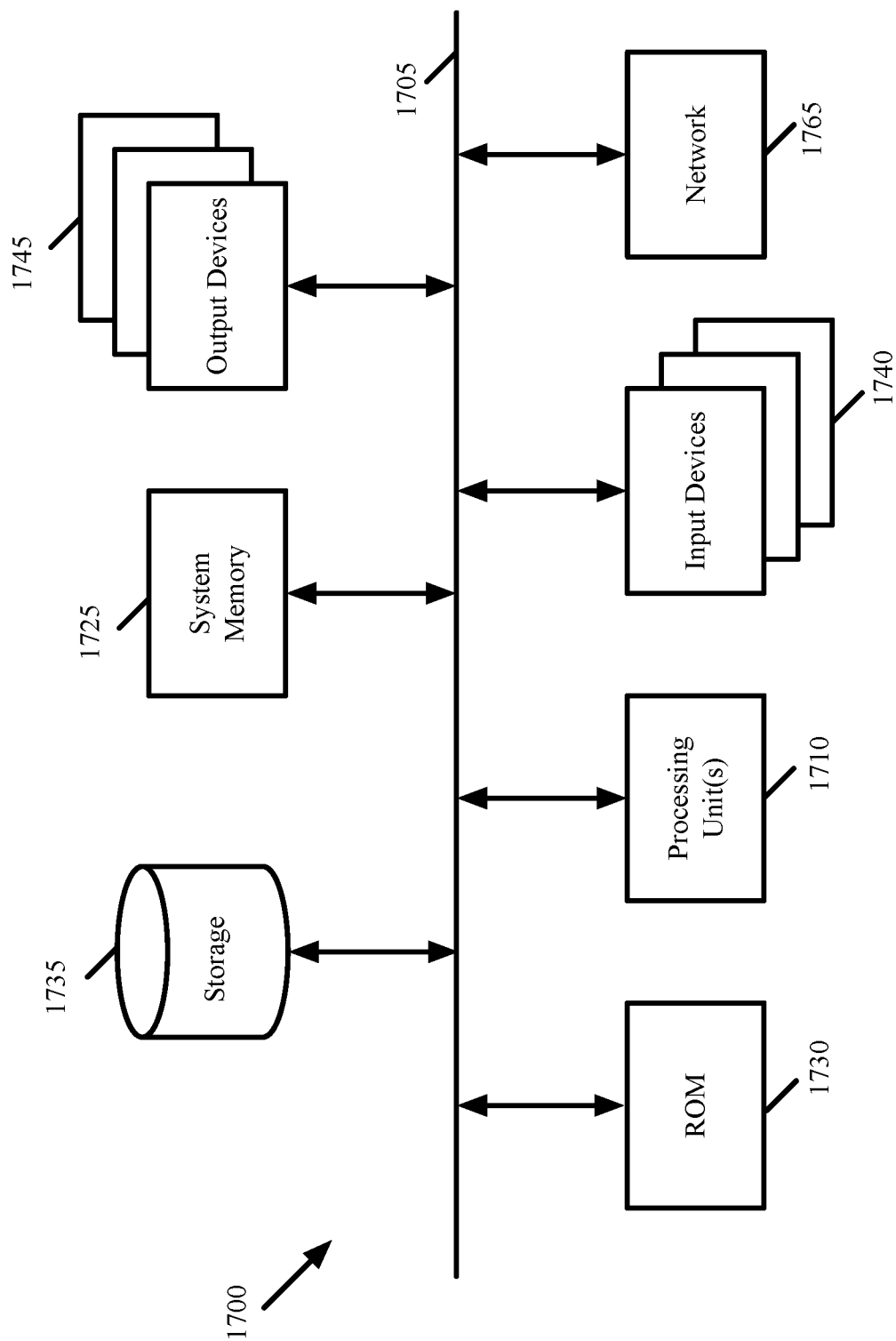
FIG. 17 conceptually illustrates an electronic system with which some embodiments of the invention are implemented.

FIG. 17 conceptually illustrates an electronic system 1700 with which some embodiments of the invention are implemented. The electronic system 1700 can be used to execute any of the control and/or compiler systems described above in some embodiments. The electronic system 1700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1700 includes a bus 1705, processing unit(s) 1710, a system memory 1725, a read-only memory 1730, a permanent storage device 1735, input devices 1740, and output devices 1745.

The bus 1705 collectively represents all system, peripheral, and chipset buses that communicatively connect the numerous internal devices of the electronic system 1700. For instance, the bus 1705 communicatively connects the processing unit(s) 1710 with the read-only memory 1730, the system memory 1725, and the permanent storage device 1735.

From these various memory units, the processing unit(s) 1710 retrieves instructions to execute and data to process in order to execute the processes of the invention. The processing unit(s) may be a single processor or a multi-core processor in different embodiments.

The read-only-memory (ROM) 1730 stores static data and instructions that are needed by the processing unit(s) 1710 and other modules of the electronic system. The permanent storage device 1735, on the other hand, is a read-and-write memory device. This device is a non-volatile memory unit that stores instructions and data even when the electronic system 1700 is off. Some embodiments of the invention use a mass-storage device (such as a magnetic or optical disk and its corresponding disk drive) as the permanent storage device 1735.

Other embodiments use a removable storage device (such as a floppy disk, flash drive, etc.) as the permanent storage device. Like the permanent storage device 1735, the system memory 1725 is a read-and-write memory device. However, unlike storage device 1735, the system memory is a volatile read-and-write memory, such a random-access memory. The system memory stores some of the instructions and data that the processor needs at runtime. In some embodiments, the invention's processes are stored in the system memory 1725, the permanent storage device 1735, and/or the read-only memory 1730. From these various memory units, the processing unit(s) 1710 retrieves instructions to execute and data to process in order to execute the processes of some embodiments.

The bus 1705 also connects to the input and output devices 1740 and 1745. The input devices enable the user to communicate information and select commands to the electronic system. The input devices 1740 include alphanumeric keyboards and pointing devices (also called "cursor control devices"). The output devices 1745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 17, bus 1705 also couples electronic system 1700 to a network 1765 through a network adapter (not shown). In this manner, the computer can be a part of a network of computers (such as a local area network ("LAN"), a wide area network ("WAN"), or an Intranet, or a network of networks, such as the Internet. Any or all components of electronic system 1700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, some of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for processing a video using a neural network, wherein the video comprises a sequence of images, the method comprising:
receiving a set of video images as a set of inputs to successive executions of the neural network; and
executing the neural network for each successive video image of the set of video images to reduce an amount of noise in the video image by (i) identifying spatial features of the video image and (ii) storing a set of state data representing identified spatial features for use in identifying spatial features of subsequent video images in the set of video images, wherein identifying spatial features of a particular video image comprises using the stored sets of spatial features of video images previous to the particular video image to identify the spatial features of the particular video image.

2. The method of claim 1, wherein identifying spatial features of the video images comprises identifying a set of objects in the video images.

3. The method of claim 1, wherein spatial features comprise any of an edge, a shape, a texture, and an orientation.

4. The method of claim 1, wherein the sequence of video images are low-light video images, the method further comprising using the identified spatial features to reduce noise in the set of low-light video images.

5. The method of claim 1, wherein the neural network comprises a plurality of nodes, wherein a subset of the nodes identify the spatial features that are stored as state data.

6. The method of claim 1, wherein identifying spatial features of a particular video image comprises using the stored set of spatial features of video images subsequent to the particular video image to identify the spatial features of the particular video image.

7. The method of claim 2 further comprising applying a first noise reduction method to a first object and a second noise reduction method to a second object.

8. The method of claim 5, wherein the subset is a first subset, wherein using the stored set of spatial features of previous video images to identify the spatial features of a particular video image comprises providing the stored set of spatial features of the previous video images to a second subset of the nodes.

9. The method of claim 7, wherein the first object has a first size and the second object has a second, different size, wherein the different noise reduction methods are associated with the different sizes of the objects.

10. The method of claim 7, wherein the first object has a first rate of change between video images and the second object has a second, different rate of change between video images, wherein the different noise reduction methods are associated with the different rates of change between video images.

11. The method of claim 8, wherein the identified spatial features have a lower spatial resolution than the video image, wherein a third subset of the nodes provide high resolution information to the second subset of nodes.

12. The method of claim 11, wherein the third subset of nodes precede the first and second subsets of nodes in the neural network.

13. A non-transitory machine readable medium storing a program which when executed by at least one processing unit processes a video using a neural network, wherein the video comprises a sequence of images, the program comprising sets of instructions for:
receiving a set of video images as a set of inputs to successive executions of the neural network; and
executing the neural network for each successive video image of the set of video images to reduce an amount of noise in the video image by (i) identifying spatial features of the video image and (ii) storing a set of state data representing identified spatial features for use in identifying spatial features of subsequent video images in the set of video images, wherein identifying spatial features of a particular video image comprises using the stored sets of spatial features of video images previous to the particular video image to identify the spatial features of the particular video image.

14. The non-transitory machine readable medium of claim 13, wherein the set of instructions for identifying spatial features of the video images comprises a set of instructions for identifying a set of objects in the video images, the program further comprising a set of instructions for applying a first noise reduction method to a first object and a second noise reduction method to a second object.

15. The non-transitory machine readable medium of claim 13, wherein spatial features comprise any of an edge, a shape, a texture, and an orientation.

16. The non-transitory machine readable medium of claim 13, wherein the sequence of video images are low-light video images, the program further comprising a set of instructions for using the identified spatial features to reduce noise in the set of low-light video images.

17. The non-transitory machine readable medium of claim 13, wherein the neural network comprises a plurality of nodes, wherein a first subset of the nodes identify the spatial features that are stored as state data, wherein the set of instructions for using the stored set of spatial features of previous video images to identify the spatial features of a particular video image comprises a set of instructions for providing the stored set of spatial features of the previous video images to a second subset of the nodes, wherein the identified spatial features have a lower spatial resolution than the video image, wherein a third subset of the nodes that precede the first and second subsets of nodes in the neural network provide high resolution information to the second subset of nodes.

18. The non-transitory machine readable medium of claim 13, wherein the set of instructions for identifying spatial features of a particular video image comprises a set of instructions for using the stored set of spatial features of video images subsequent to the particular video image to identify the spatial features of the particular video image.

19. The non-transitory machine readable medium of claim 14, wherein the first object has a first size and the second object has a second, different size, wherein the different noise reduction methods are associated with the different sizes of the objects.

20. The non-transitory machine readable medium of claim 14, wherein the first object has a first rate of change between video images and the second object has a second, different rate of change between video images, wherein the different noise reduction methods are associated with the different rates of change between video images.

* * * * *